United States Patent
Shimozono et al.

(10) Patent No.: US 7,124,169 B2
(45) Date of Patent: Oct. 17, 2006

(54) NETWORK SYSTEM AND ITS SWITCHES

(75) Inventors: Norio Shimozono, Machida (JP);
Naoko Iwami, Sagamihara (JP);
Kiyoshi Honda, Yokohama (JP)

(73) Assignee: Hitachi, Ltd., Tokyo (JP)

( * ) Notice: Subject to any disclaimer, the term of this patent is extended or adjusted under 35 U.S.C. 154(b) by 81 days.

(21) Appl. No.: 10/646,036

(22) Filed: Aug. 22, 2003

(65) Prior Publication Data

US 2005/0008016 A1 Jan. 13, 2005

(30) Foreign Application Priority Data

Jun. 18, 2003 (JP) .............................. 2003-172770

(51) Int. Cl.
*G06F 15/16* (2006.01)

(52) U.S. Cl. ...................................... 709/211; 711/154

(58) Field of Classification Search ................ 709/211, 709/217–219, 213–216, 248
See application file for complete search history.

(56) References Cited

U.S. PATENT DOCUMENTS

| | | | |
|---|---|---|---|
| 6,449,688 B1 * | 9/2002 | Peters et al. ................ 711/112 |
| 6,477,618 B1 | 11/2002 | Chilton |
| 6,493,750 B1 | 12/2002 | Mathew et al. |
| 6,643,795 B1 * | 11/2003 | Sicola et al. .................... 714/6 |
| 6,654,795 B1 * | 11/2003 | Coile ......................... 709/219 |
| 6,691,198 B1 | 2/2004 | Hamlin |
| 6,701,411 B1 | 3/2004 | Matsunami et al. |
| 6,742,020 B1 | 5/2004 | Dimitroff et al. |
| 6,772,365 B1 * | 8/2004 | Obara ............................ 714/6 |
| 6,779,119 B1 * | 8/2004 | Moshfeghi et al. .......... 713/201 |
| 6,876,656 B1 * | 4/2005 | Brewer et al. ............... 370/392 |
| 6,947,981 B1 * | 9/2005 | Lubbers et al. ............. 709/223 |
| 6,957,303 B1 * | 10/2005 | Fujimoto et al. ............ 711/114 |
| 6,977,927 B1 * | 12/2005 | Bates et al. .................. 370/381 |
| 2002/0042866 A1 | 4/2002 | Grant et al. |
| 2002/0091898 A1 * | 7/2002 | Matsunami et al. ......... 711/114 |
| 2002/0103889 A1 * | 8/2002 | Markson et al. ............. 709/223 |
| 2002/0112113 A1 | 8/2002 | Karpoff et al. |
| 2002/0124134 A1 | 9/2002 | Chilton |
| 2002/0143999 A1 | 10/2002 | Yamagami |
| 2002/0144058 A1 | 10/2002 | Burger et al. |
| 2002/0156687 A1 | 10/2002 | Hashimoto |
| 2003/0093541 A1 * | 5/2003 | Lolayekar et al. .......... 709/230 |

(Continued)

FOREIGN PATENT DOCUMENTS

EP  1085414 A2  3/2001

(Continued)

*Primary Examiner*—William C. Vaughn, Jr.
*Assistant Examiner*—Greg Bengzon
(74) *Attorney, Agent, or Firm*—Townsend and Townsend and Crew LLP

(57) ABSTRACT

A copy management switch is placed in a network that connects a storage device with a computer. This copy management switch is connected to the computer, a first storage device, and a second storage device over the network. The copy management switch copies beforehand data stored in the first storage device to the second storage device. On receiving a read request, which is issued from the computer to the first storage device, the copy management switch converts the read request to the first storage device into a read request to the second storage device, and then transmits the converted read request to the second storage device. The second storage device transfers, to the copy management switch, data corresponding to the read request. The copy management switch transfers the data to the computer as data transferred from the first storage device.

8 Claims, 19 Drawing Sheets

U.S. PATENT DOCUMENTS

| | | |
|---|---|---|
| 2003/0120751 A1* | 6/2003 | Husain et al. ............... 709/219 |
| 2003/0158966 A1* | 8/2003 | Sato ........................... 709/242 |
| 2003/0189936 A1* | 10/2003 | Terrell et al. .......... 370/395.31 |
| 2003/0204597 A1* | 10/2003 | Arakawa et al. ............ 709/226 |
| 2003/0236851 A1* | 12/2003 | Cuddihy et al. ............ 709/214 |
| 2004/0073677 A1 | 4/2004 | Honma et al. |
| 2004/0078466 A1 | 4/2004 | Coates et al. |
| 2004/0078599 A1 | 4/2004 | Nahum |
| 2004/0088297 A1 | 5/2004 | Coates et al. |
| 2004/0088574 A1 | 5/2004 | Walter et al. |
| 2004/0111485 A1* | 6/2004 | Mimatsu et al. ............ 709/213 |
| 2004/0128456 A1 | 7/2004 | Kobayashi et al. |
| 2004/0133634 A1 | 7/2004 | Luke et al. |
| 2004/0158673 A1* | 8/2004 | Matsunami et al. ........ 711/114 |
| 2004/0233910 A1* | 11/2004 | Chen et al. ............... 370/395.5 |
| 2004/0236772 A1* | 11/2004 | Arakawa et al. ............ 707/100 |

FOREIGN PATENT DOCUMENTS

| | | |
|---|---|---|
| JP | 2002-132455 | 5/2002 |
| WO | WO03/017598 A1 | 2/2003 |
| WO | WO03/027856 A1 | 4/2003 |

* cited by examiner

NETWORK SYSTEM AND ITS SWITCHES

BACKGROUND OF THE INVENTION

The present invention relates to switches placed in a network that connects a storage device with a computer.

With the increasing storage capacity of storage devices used in companies and the like, a system in which a connection between storage devices, or between storage devices and computers, is made via a network such as a fiber channel is becoming popular. The network providing a connection between the storage devices or between others, or the total system in which a connection is made via the network, is called a storage area network (hereinafter referred to as SAN).

On the other hand, examples of technologies that reduce the frequency of data transfer in a network so as to shorten time required for causing a computer to access data stored in a storage device include a network cache technology. To be more specific, a storage area (hereinafter referred to as a "cache device") for temporarily storing data on a network is first prepared, and subsequently, if through the cache device the computer reads out data stored in the storage device, the read data is stored in the cache device, which then returns a response when the data is accessed thereafter. As a result, the access time for the data is shortened.

An example in which the network cache technology is employed in SAN is disclosed in Japanese Patent Laid-open No. 2002-132455 (patent document 1). To be more specific, after a computer called a metadata server is provided in SAN, a computer first accesses the metadata server when accessing a storage device. The metadata server notifies the computer of a location of data to be accessed. If a cache is used, the computer is notified of a location of a device having the cache.

In addition, examples of technologies for placing a device having a cache on a network such as the Internet or WWW include a technology called transparent cache. In this technology, when a switch receives an access request for data, which has been issued from a computer to a storage device, the switch transmits the access request to a computer having a cache (hereinafter referred to as a "cache server") as a first step. If a target file of the access request exists in the cache possessed by the cache server (hereinafter referred to as a "cache hit"), the cache server transmits the target file to the computer that has issued the access request. On the other hand, if the target data does not exist in the cache (hereinafter referred to as a "cache miss"), the cache server transmits an access request to the storage device to obtain the data, and then transmits the obtained data to the computer that has issued the access request.

As described above, if the network cache technology is employed in SAN, when a cache hit is encountered, the time taken for obtaining the requested data is shortened.

However, as far as the technology disclosed in patent document 1 is concerned, although it is possible to install a cache device in SAN, a metadata server is required to access data, and the settings and operation of the computer need to be changed. More specifically, a protocol used for accessing data (for instance, the SCSI protocol), which is conventionally used in SAN, needs to be changed to a dedicated protocol that uses the metadata server.

In the meantime, as is the case with the transparent cache, if a network cache technology for handling data on a file basis is used, it is difficult to speed up a response because processing for judging a cache hit is complicated.

To be more specific, if cache processing is performed on a file basis, a read request is equivalent to an access request specifying a file name, etc. On receiving the access request, the cache server first reads out a file held in its own storage device, together with data called metadata which stores the association of the file with a corresponding block in the storage device, and then searches the read data for the file specified by the read request to judge whether or not a cache hit is encountered. Because this search processing judges the coincidence of a name or the like, processing of the block access protocol such as SCSI becomes more complicated than the comparison between numerical values of logical block addresses used to specify locations to be accessed.

SUMMARY OF THE INVENTION

An object of the present invention is to speed up an access to data without changing settings of a computer in SAN so that a network bandwidth can be saved.

In order to achieve the above-mentioned object, a network system according to the present invention has the undermentioned configuration. To be more specific, according to one aspect of the present invention, there is provided a network system comprising: a computer; a switch that is connected to the computer; a first storage device that is connected to the switch via a network; and a second storage device that is connected to the switch via the network.

In this network system, the switch transfers data stored in the first storage device to the second storage device according to an instruction from outside. Then, on receiving from the computer an access request for the data stored in the first storage device, the switch converts the access request into an access request to the second storage device, and then transmits the converted access request to the second storage device. Next, after receiving data from the second storage device, the switch converts the received data into such data that can be recognized as data transmitted from the first storage device, and then transmits the converted data to the computer.

It is to be noted that a second computer connected to the switch may also give an instruction to the switch. Additionally, the switch may also provide the computer with a virtual storage corresponding to the first storage device. In this case, the computer issues an access request to the virtual storage.

Moreover, according to another aspect of the present invention, the above-mentioned switch and the second storage device may also be integrated into one device.

According to still another aspect of the present invention, instead of transferring beforehand data stored in the first storage device to the second storage device, the switch may also transfer the data stored in the first storage device to the second storage device in response to an access request from the computer. Further, in this case, the switch may have information about whether or not the data stored in the first storage device has been transferred to the second storage device, and transmit an access request to the first storage device or the second storage device according to the information. Furthermore, in this aspect, when the switch transfers data from the first storage device to the second storage device, the switch checks the amount of free storage capacity of the second storage device. If the amount of free storage capacity provided by the second storage device is not enough to store the data to be transferred, the switch deletes some amount of data stored in the second storage device according to a predetermined criterion, e.g., according to the frequency of use by the computer, so as to transfer the data to an area where the data deletion is performed.

It is to be noted that instead of the switch, the first storage device or the second storage device may also control the transmission of data.

DETAILED DESCRIPTION OF THE INVENTION

Figure 1:
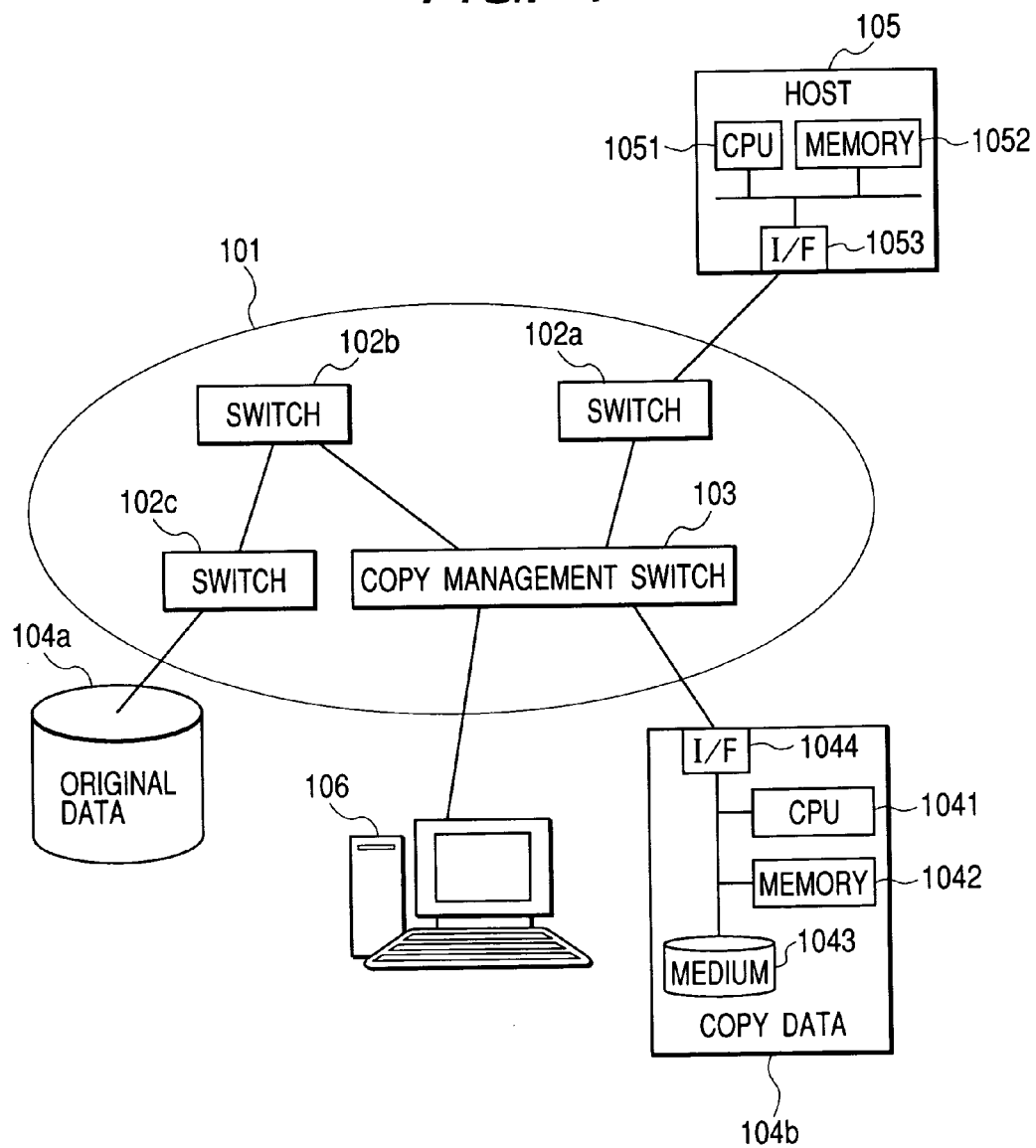
FIG. 1 is a diagram illustrating a configuration of a computer system according to a first embodiment of the present invention.

FIG. 1 is a diagram illustrating a first embodiment of a computer system to which the present invention is applied. The computer system comprises a SAN 101, a host 105, a storage device 104a, and a storage device 104b. The host 105, the storage device 104a, and the storage device 104b are interconnected over the SAN 101. The SAN 101 comprises the host 105, switches 102a, 102b, 102c, and a copy management switch 103 described later.

This embodiment, which will be described below, is based on the assumption that the host 105 makes a read request for data (hereinafter referred to as "original data") stored in the storage device 104a.

The host 105 is a computer comprising a CPU 1051, a memory 1052, and an interface 1053 used to make a connection to the SAN 101.

The storage device 104 comprises the following: a medium 1043 for storing data; an interface 1044 used to make a connection to the SAN 101; a CPU 1041 for executing a program used to respond to a request from the host 105; and a memory 1042. Incidentally, a variety of examples could be conceivable as the medium 1043 included in the storage device 104. For example, a disk array constituted of a plurality of hard disk drives may also be adopted as the medium 1043.

In addition, on receiving a data read request from the host 105, the storage device 104 transmits to the host 105 data corresponding to the request, and then transmits a response notifying that the transmission is completed.

The switches 102a, 102b, 102c, and the copy management switch 103 mutually exchange connection information to create a routing table required for routing processing described below. To be more specific, they exchange information indicating a load (overhead) of communication between arbitrary two switches (hereinafter referred to as a "connection cost"). In general, the connection cost becomes larger with decrease in communication bandwidth of a communication line between the arbitrary two switches. However, an administrator or the like can also set a connection cost at a given value through a management terminal 106 described below. Each of the switches calculates, from all connection costs obtained, the sum of the connection costs for a path leading to each of the other switches, and thereby finds a path for which the sum of the connection costs is the lowest. The path is then stored in the routing table.

A SAN domain address unique to each switch is assigned to each of the switches 102a, 102b, 102c and the copy management switch 103. Additionally, a unique SAN address is assigned to each of the storage devices 104a, 104b and the host 105. Here, the SAN address is an address constituted of: a SAN domain address of a switch in the SAN 101, which is connected to a device (hereinafter referred to also as a "node") such as a computer connected to the SAN 101; and a SAN node address unique to a group (hereinafter referred to as a "domain") specified by the SAN domain address.

When transmitting/receiving a frame to/from another node, each node specifies a source node and a destination node by adding a source SAN address and a destination SAN address to the frame. Each of the switches 102a, 102b, 102c and the copy management switch 103 searches the routing table for a destination SAN domain address of a frame to route the frame. In addition, if the destination SAN domain address of the frame agrees with a SAN domain address of the switch 102, the frame is transferred to a node directly connecting to the switch 102, which has a SAN node address that agrees with a destination SAN node address of the frame. It should be noted that a frame is a unit of data or an access request transmitted through a protocol used for the SAN 101.

This embodiment is based on the assumption that because of a low connection cost, a short distance, performance of the storage device 104b higher than that of the storage device 104a, or the like, the host 105 can access the storage device 104b at higher speed as compared with a case where the host accesses the storage device 104a.

The management terminal 106 is connected to the copy management switch 103. The user or administrator of the computer system according to this embodiment instructs the copy management switch 103 to copy original data to the storage device 104b by use of the management terminal 106. At this time, the administrator enters, through the management terminal 106, information indicating the association of a location of the original data with a location of the copied data (hereinafter referred to as "copy data") in the copy management switch 103, more specifically, in a copy management table 131 described below. In this connection, the administrator or the like may also instruct, through the management terminal 106, the copy management switch 103 to collect information about the frequency of accesses from the host 105 to the storage device 104a, and the like, and then to copy to the storage device 104b only areas, for which the access frequency is high, instead of the whole original data.

Further, the switches 102a, 102b, 102c and the copy management switch 103 may also be adapted to perform name management. For example, a fiber channel switch has a table used to search for a unique SAN address of a port in the SAN 101 by use of a world wide name (hereinafter referred to as WWN) which is a unique and unchangeable value in the world and which is assigned to a node or a port. The WWN includes a WWPN (World Wide Port Name) that is unique to a port connected to the SAN 101, and a WWNN (World Wide Node Name) that is unique to a node. A node having a plurality of connection ports are allowed to have one WWNN and a plurality of WWPNs. In addition, also in the standard called iSCSI that makes the SCSI protocol usable on an IP network, there is a name management system called iSNS.

Figure 2:
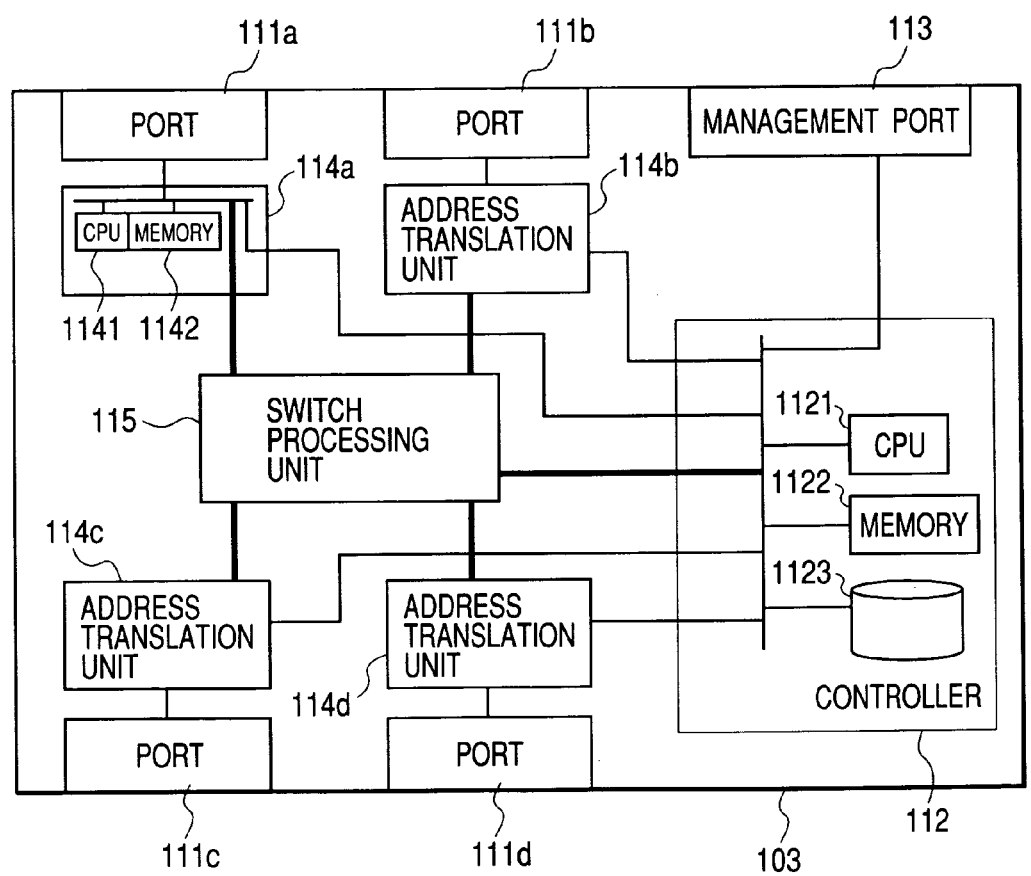
FIG. 2 is a diagram illustrating a configuration of a copy management switch according to the first embodiment.

FIG. 2 is a diagram illustrating a configuration of the copy management switch 103. The copy management switch 103 comprises the following: a port 111 used to connect another node; a controller 112; a management port 113 used to connect the management terminal 106; an address translation unit 114; and a switch processing unit 115 that performs routing and switching. The switch processing unit 115 holds the routing table required for routing.

The controller 112 comprises a CPU 1121, a memory 1122, and an on-volatile storage 1123. The address translation unit 114 comprises a CPU 1141 and a memory 1142. It is to be noted that because the configuration disclosed in this figure is merely a preferred embodiment, another configuration may also be applied so long as it can achieve equivalent functions.

Figure 3:
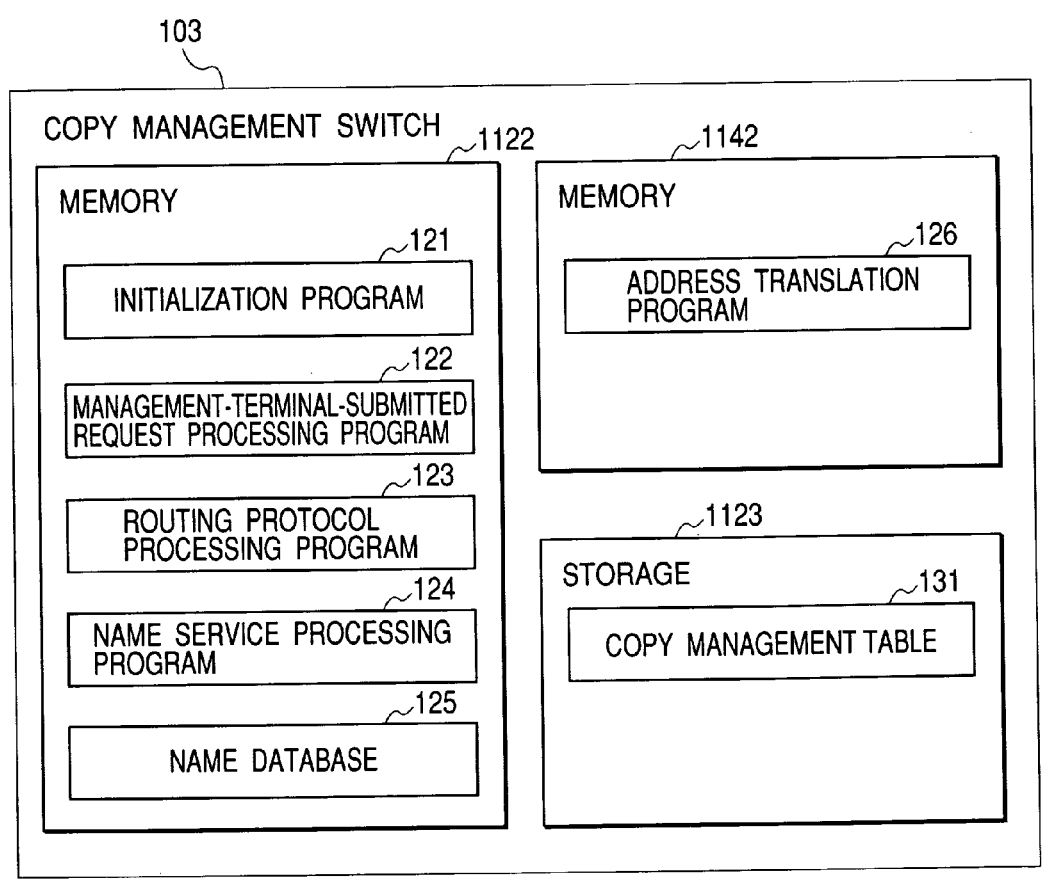
FIG. 3 is a diagram illustrating a memory configuration of a copy management switch according to the first embodiment.

FIG. 3 is a diagram illustrating programs and data that are stored in the memories 1122, 1142 and non-volatile storage 1123 of the copy management switch 103.

The initialization program 121 is a program that is executed by the CPU 1121 upon start-up of the copy management switch 103. By executing the initialization program 121, the CPU 1121 reads each of the other programs from the non-volatile storage 1123 into the memory 1122 and the memory 1142, and also reads the copy management table 131 described below into the memory 1142 possessed by each address translation unit 114.

A management-terminal-submitted request processing program 122, a routing protocol processing program 123, and a name service processing program 124 are stored in the memory 1122 of the controller 112. The CPU 1121 executes these programs. An address translation program 126 is stored in the memory 1142 of the address translation unit 114, and is executed by the CPU 1141.

By executing the management-terminal-submitted request processing program 122, the CPU 1121 changes contents of the copy management table 131 according to a request submitted from the management terminal 106, which is received through the management port 113. Additionally, by executing the management-terminal-submitted request processing program 122, the CPU 1121 executes copy of data according to the request from the management terminal 106.

On the other hand, by executing the management-terminal-submitted request processing program 122, the CPU 1121 can perform management applied to general switches. Incidentally, examples of protocols used for the management port 113 include TCP/IP. However, another protocol may also be used so long as it is possible to communicate with the management terminal 106 by the protocol.

Further, by executing the routing protocol processing program 123, the CPU 1121 exchanges information about connections in the SAN 101 (hereinafter referred to as "connection information") with another switch 102 to create a routing table, and then stores the created routing table in the memory possessed by the switch processing unit 115.

By executing the name service processing program 124, the CPU 1121 writes to the name database 125 information about nodes connected to the copy management switch 103, whereas the CPU 1121 responds to a search request from the node. For the purpose of receiving from the node the request for searching the name database 125, a SAN address is allocated to the controller 112.

During the execution of the address translation program 126 by the CPU 1141 of the address translation unit 114, as soon as the port 111 receives a frame, the CPU 1141 translates destination and source SAN addresses of a read request, read data, or the like, according to information stored in the copy management table 131. Details in the address translation processing will be described later. It is to be noted that although the address translation processing is executed on the basis of the program in this embodiment, dedicated hardware may also perform the address translation processing.

Figure 4:
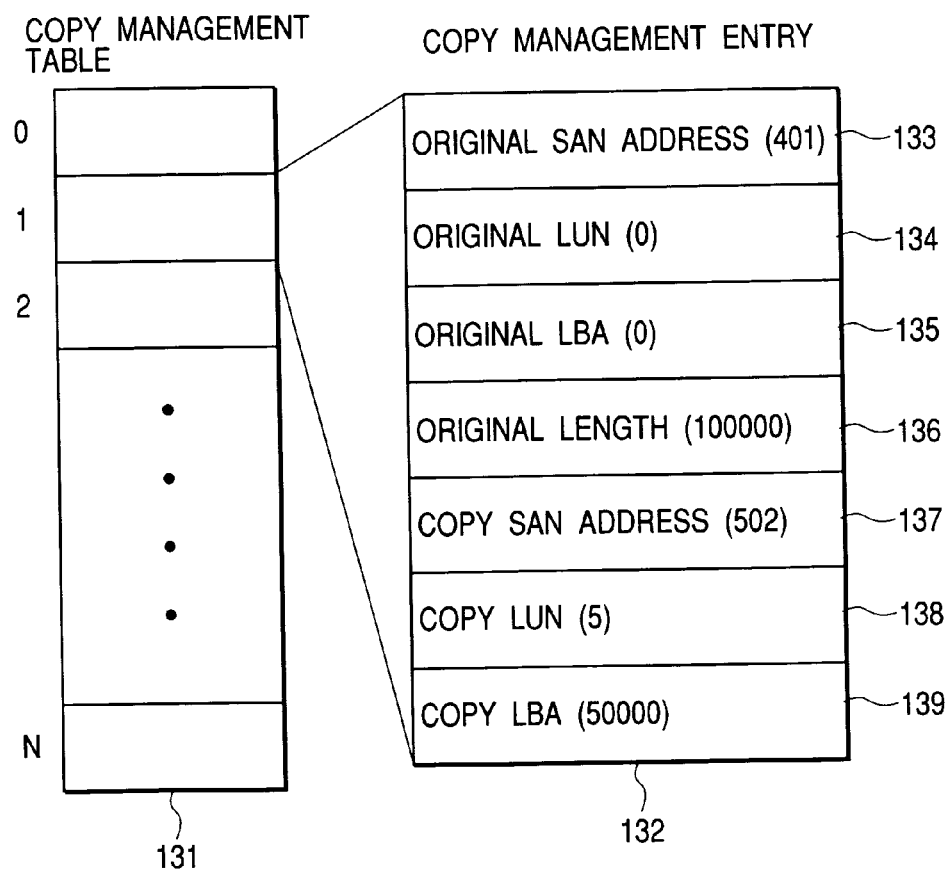
FIG. 4 is a diagram illustrating a configuration of a copy management table according to the first embodiment.

FIG. 4 is a diagram illustrating how the copy management table 131 is configured. The copy management table 131 has a plurality of copy management entries 132. Each of the copy management entries 132 holds information about the association of original data with copy data. The copy management entry 132 comprises the following: a field 133 for storing an original SAN address indicating the storage device 104 that stores the original data; a field 134 for storing a number indicating a logical unit in the storage device 104 that stores the original data (hereinafter referred to as a "original LUN"); a field 135 for storing a logical block address indicating a starting location of the original data in the logical unit (hereinafter referred to as a "original LBA"); a field 136 for storing an original length indicating a size of the original data; a field 137 for storing a copy SAN address indicating the storage device 104 that stores the copy data corresponding to the original data stored in the copy management entry 132; a field 138 for storing a number indicating a logical unit in the storage device 104 that stores the copy data (hereinafter referred to as "copy LUN"); and a field 139 for storing a logical block address indicating a starting location of the copy data in the logical unit (hereinafter referred to as "copy LBA"). Incidentally, because a data length of the copy data is the same as that of the original data, a field for storing a copy length is not necessary.

Next, operation of each device according to the present invention will be outlined below.

In this embodiment, according to an instruction from an administrator or the like, the copy management switch 103 first transfers original data stored in the storage device 104a to the storage device 104b to create copy data therein. In this case, information indicating the association of the storage device 104a storing the original data with the storage device 104b storing the copy data is written to the copy management table 131.

After completing the above-mentioned copy processing, on receiving a read request from the host 105, the copy management switch 103 judges whether or not the information indicating the association of the original data with the copy data includes the address information held in a frame which includes the read request, and thereby determines whether or not data corresponding to the read request is the original data, and whether or not there exists the copy data corresponding to the original data.

If there is the copy data corresponding to the original data as a target of the read request, the copy management switch 103 converts the read request for the original data stored in the storage device 104a, which has been received from the host 105, to a read request to the storage device 104b that stores the copy data. To be more specific, the copy management switch 103 changes a SAN address indicating a request destination (storage device 104a), which is included in the read request, to a SAN address of the storage device 104b that stores the copy data. This enables effective use of the network.

How to create copy data will be described below. The user or administrator of the system uses the management terminal 106 to transmit the following information to the copy management switch 103: a SAN address of the storage device 104a; a logical unit number (hereinafter referred to as "LUN") that is an address of original data in the storage device 104a; a logical block address (hereinafter referred to as "LBA"); a length of the original data; a SAN address of the storage device 104b; and a data copy destination's LUN and LBA.

The controller 112 which has received the information transmits the read request for the original data to the storage device 104a.

Next, the controller 112 stores in the memory 1122 the read data that has been transmitted from the storage device 104a. Subsequently, the controller 112 transmits a write request to the storage device 104b, and thereby writes the original data stored in the memory 1122 to the storage device 104b. The data is copied through the above-mentioned processing.

Incidentally, the copy operation described above is merely an example of the copy processing. Therefore, how to copy the data is not limited to this method. For example, the controller 112 may also be provided with a dedicated buffer for storing read data instead of the memory 1122. In addition, the storage device 104a itself may also perform the copy processing. For example, the SCSI protocol standard contains a command of EXTENDED COPY.

On receiving the EXTENDED COPY command, the storage device that can handle this command copies a specific area in the storage device to a specific area in another storage device according to what the command specifies.

Thus, if the storage device 104a holding the original data can handle the EXTENDED COPY command, it is possible to perform the copy processing also in the manner described below.

The controller 112 transmits the EXTENDED COPY command for copy processing to the storage device 104a that holds the original data. The storage device 104a transfers to the storage device 104b contents of a storage area specified by the EXTENDED COPY command. After the transfer of the data stored in the specified storage area ends, the storage device 104a transmits a response indicating the end of the processing to a source of the EXTENDED COPY command (in this case, to the copy management switch 103) before the copy processing is completed.

Next, operation of the copy management switch 103 after the completion of the copy processing will be described.

As described above, the copy management switch 103 which has received the frame from the host 105 translates a source address, or a destination address, of the frame by the address translation unit 114, and then transmits the frame to an appropriate device.

Figure 5:
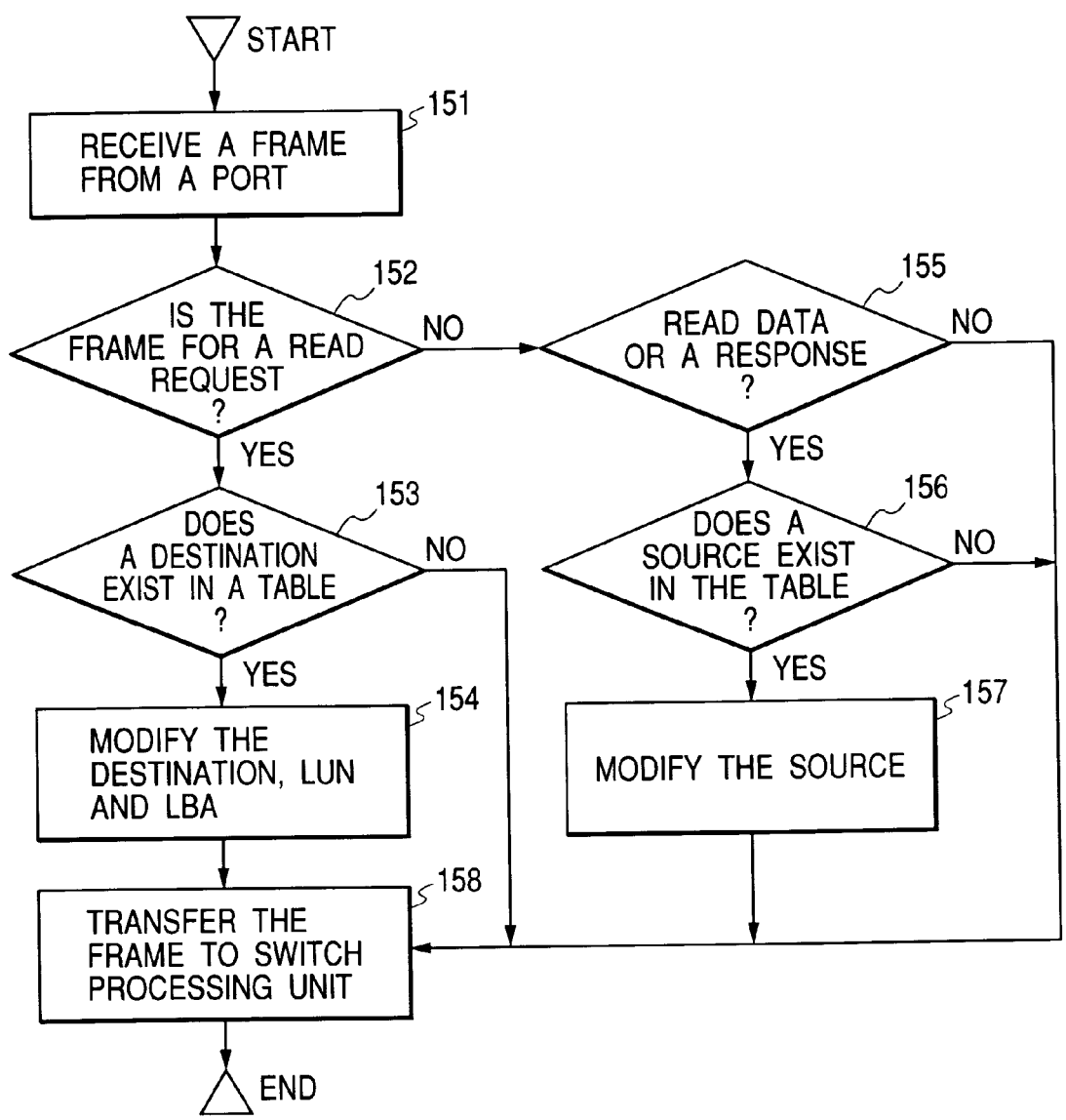
FIG. 5 is a flowchart illustrating address translation processing according to the first embodiment.

FIG. 5 is a flowchart illustrating an example of how the address translation unit 114 executes address translation processing.

The instant the port 111 receives a frame, the CPU 1141 starts execution of the address translation program 126 (step 151). Then, the CPU 1141 judges whether or not the frame received by the port 111 is a frame containing the read request to the storage device 104 which has been issued by the host 105 (step 152).

If the frame contains the read request, the CPU 1141 judges whether or not a copy of data requested by the read request exists in the computer system. To be more specific, the CPU 1141 judges whether or not the copy management table 131 has a copy management entry 132 satisfying a condition that an area indicated by the information stored in the field 133, the field 134, the field 135, and the field 136, which are included in the copy management entry 132, includes an area indicated by a destination SAN address, a LUN, a LBA, and a length which are stored in the frame containing the read request (step 153).

If the copy management entry 132 satisfying the condition of step 153 exists, the CPU 1141 converts, by use of the copy management entry 132, the frame containing the read request into a frame containing a read request for the storage device 104 in which the copy data is stored (step 154). To be more specific, the CPU 1141 changes a destination of the frame containing the read request to the value stored in the field 137, changes the LUN to the value stored in the field 138, and changes the LBA to a value determined by (LBA+ the value stored in the field 139– a value stored in the field 135).

If it is judged that the frame is not intended for a read request in step 152, then the CPU 1141 judges whether the contents of the frame are intended for data (hereinafter referred to as "read data" that is transmitted from the storage device 104 according to the read request or a response (step 155). If the frame is intended for read data or a response, the CPU 1141 judges whether or not the read data or the response is transmitted from the storage device 104b that stores the copy data. To be more specific, the CPU 1141 judges whether or not the copy management table 131 has the copy management entry 132, a frame source of which agrees with a value stored in the field 137 (step 156).

If the frame is transmitted from the storage device 104b that stores the copy data, the CPU 1141 refers to the copy management entry 132 that has been found in step 156 to change the frame source to an original SAN address stored in the field 133 (step 157).

After the processing described in steps 154 and 157 ends, the CPU 1141 transmits the frame completing the processing to the switch processing unit 115. In this connection, if there exists no appropriate copy management entry 132 in step 153 or 156, or if it is judged in step 155 that the frame is neither read data nor a response, the CPU 1141 transmits to the switch processing unit 115 the received frame just as it is (step 158).

A series of operation of the computer system according to this embodiment will be summarized as below.

The user or administrator of the system uses the management terminal 106 to instruct the copy management switch 103 to perform data copy and prepare the copy management table 131.

FIG. 4 illustrates an example as follows: a SAN domain address of the switch 102*c* is 4; a SAN node address of the storage device 104*a* is 01; a SAN domain address of the copy management switch 103 is 5; a SAN node address of the storage device 104*b* is 02; original data having a length of 100000 is stored in LUN 0 of the storage device 104*a* starting from LBA 0; and the whole original data is copied to an area starting from LBA 50000 of LUN 5 of the storage device 104*b*. In addition, information indicating the association of the original data with the copy data is stored in each field of the copy management entry 132.

The host 105 issues a read request to the storage device 104*a*. A frame corresponding to the read request includes the SAN address, LUN, LBA, and length of the storage device 104*a* as a destination, and the SAN address of the host 105 as a source.

The read request is routed according to the SAN address of the destination, and consequently arrives at the copy management switch 103 via the switch 102*a*. The copy management switch 103 which has received the read request checks contents of the frame against the information in the copy management table 131. If there exists copy data corresponding to the read request, the copy management switch 103 converts the read request into a read request for the copy data, and then routes the converted frame to the storage device 104*b*.

The storage device 104*b* that has received the read request reads the copy data as a target of the read request, and then transmits the read data to the host 105 as a source of the read request. A frame of the read data includes a SAN address of the host 105 as a destination, and a SAN address of the storage device 104*b* as a source.

The copy management switch 103 which has received the read data changes the source of the read data to the storage device 104*a* according to the information of the copy management table 131. After that, the read data is routed according to the SAN address of the destination, and consequently arrives at the host 105 via the switch 102*a*. The host 105 receives the read data as if it were transmitted from the storage device 104*a*.

As a result of the series of operation, the read request to the storage device 104*a* is actually handled by the storage device 104*b* capable of accessing at higher speed in the SAN 101. Accordingly, response speed becomes higher, making it possible to reduce loads on the switches 102*b*, 102*c*, and the storage device 104*a*.

Figure 6:
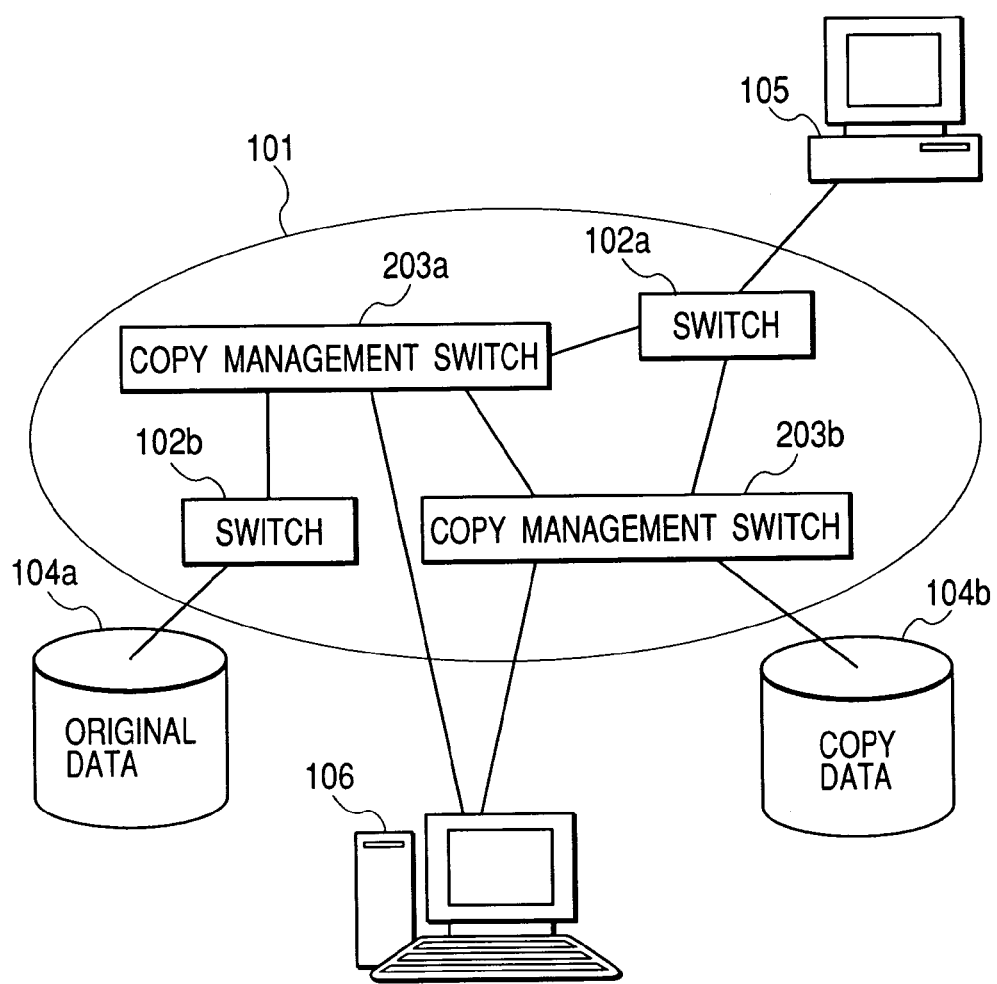
FIG. 6 is a diagram illustrating a configuration of a computer system according to a second embodiment of the present invention.

FIG. 6 is a diagram illustrating a second embodiment of a computer system to which the present invention is applied. A point of difference between the first and second embodiments is that a plurality of the copy management switches 203 are provided in the second embodiment. It is to be noted that because other configurations are similar to those in the first embodiment, detailed description thereof will be omitted.

Additionally, this embodiment is based on the assumptions that the shortest route from the host 105 to the storage device 104*a* is the host 105→the switch 102*a*→the copy management switch 203*a*→the switch 102*b*→the storage device 104*a*, and that the shortest route from the host 105 to the storage device 104*b* is the host 105→the switch 102*a*→the copy management switch 203*b*→the storage device 104*b*. Moreover, this embodiment is also based on the assumption that a connection cost from the host 105 to the storage device 104*a* is higher than that from the host 105 to the storage device 104*b*.

The administrator or user of the system uses the management terminal 106, which is connected to the copy management switches 203*a*, 203*b*, to instruct the copy management switch 203*b* to copy original data held in the storage device 104*a* to the storage device 104*b*, and then writes information indicating the association of the original data with copy data to the copy management table 231 possessed by the copy management switches 203*a*, 203*b*.

In addition, a proxy address table 241 as well as the programs described in the first embodiment is stored in the memory 1122 possessed by the copy management switch 203. Moreover, contents of the address translation program 226 executed by the CPU 1141 also differ from those described in the first embodiment.

Figure 11:
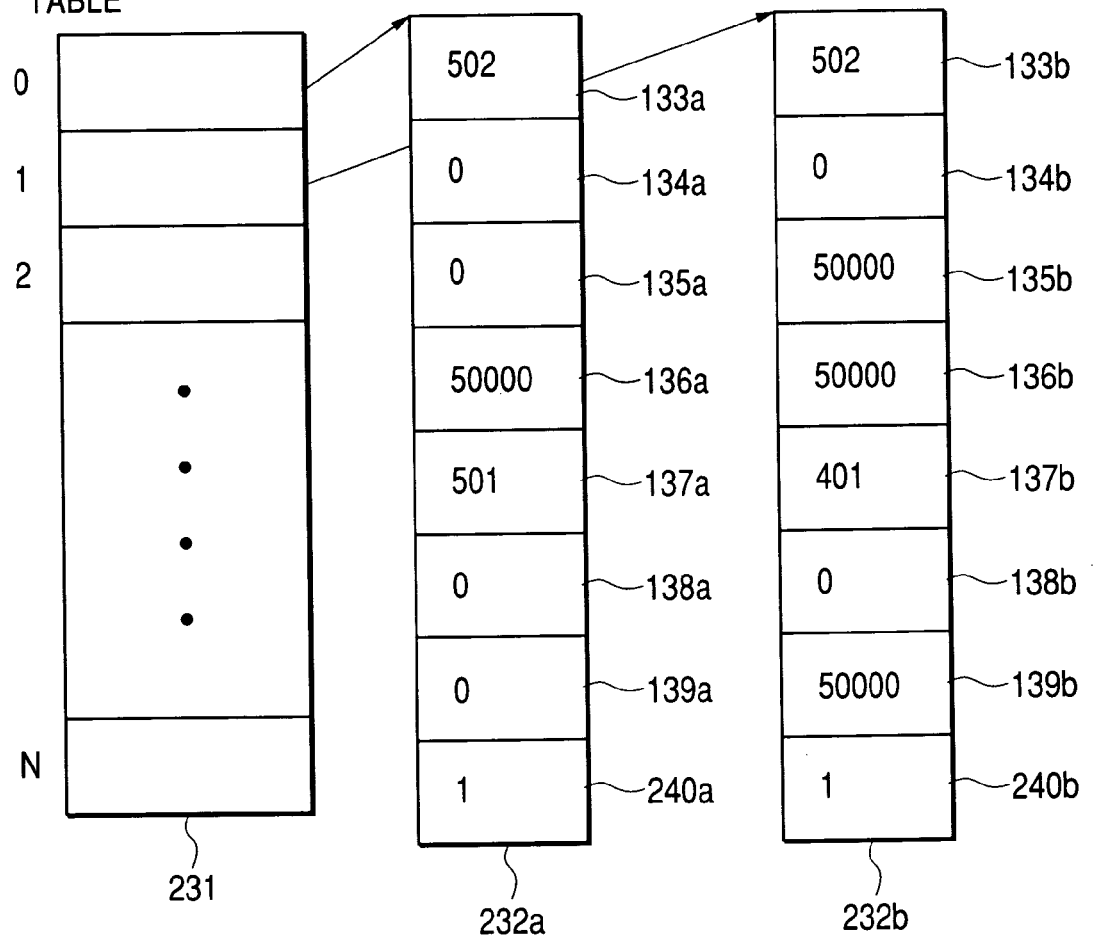
FIG. 11 is a diagram illustrating an example of a copy management table according to the third embodiment.

Further, as a substitute for the copy management table 131, the copy management table 231 is stored in the non-volatile storage 1123. FIG. 11 is a diagram illustrating an example of the copy management table 231. In addition to the fields of the copy management entry 132 in the first embodiment, the copy management entry 232 of the copy management table 231 has a field 240 for storing a local flag.

The local flag is a flag indicating the relationship of connection between the storage device 104 corresponding to the original SAN address 133 of the copy management entry 232 possessed by the copy management switch 203 and each of the plurality of copy management switches 203 including this copy management switch 203. To be more specific, each value is set in accordance with the number of devices existing between each of the plurality of copy management switches 203 and the storage device 104. Hereinafter a state in which the number of devices is small is expressed as "near".

In this embodiment, the copy management switch 203*b* is connectedly disposed at a position nearer to the storage device 104*b* than the copy management switch 203*a*. Therefore, the management terminal 106 stores in the copy management table 231 of the copy management switch 203*a* the copy management entry 232 in which a local flag is 0, and stores in the copy management table 231 of the copy management switch 203*b* the copy management entry 232 in which a local flag is 1.

Figure 7:
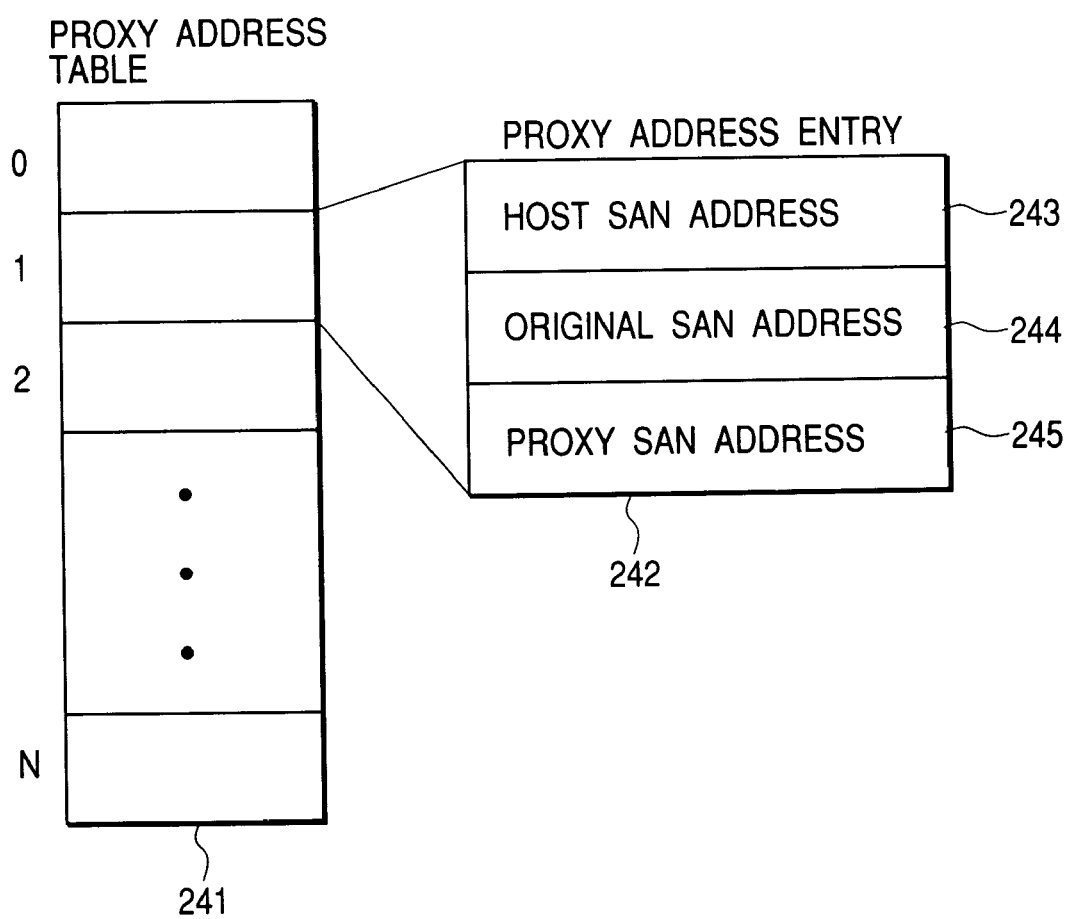
FIG. 7 is a diagram illustrating a configuration of a proxy address table according to the second embodiment.

FIG. 7 is a diagram illustrating a configuration of the proxy address table 241. The proxy address table 241 is a table for storing the association among a SAN address that points to the host 105 requesting data (hereinafter referred to as a "host SAN address"), an original SAN address, and a proxy address used for address translation processing in this embodiment (hereinafter referred to as a "proxy SAN address").

The proxy address table 241 has a plurality of proxy address entries 242. Each of the proxy address entries 242 comprises a field 243 for storing a host SAN address, a field 244 for storing an original SAN address, and a field 245 for storing a proxy SAN address. How to use the proxy address table 241 will be described later.

Figure 8:
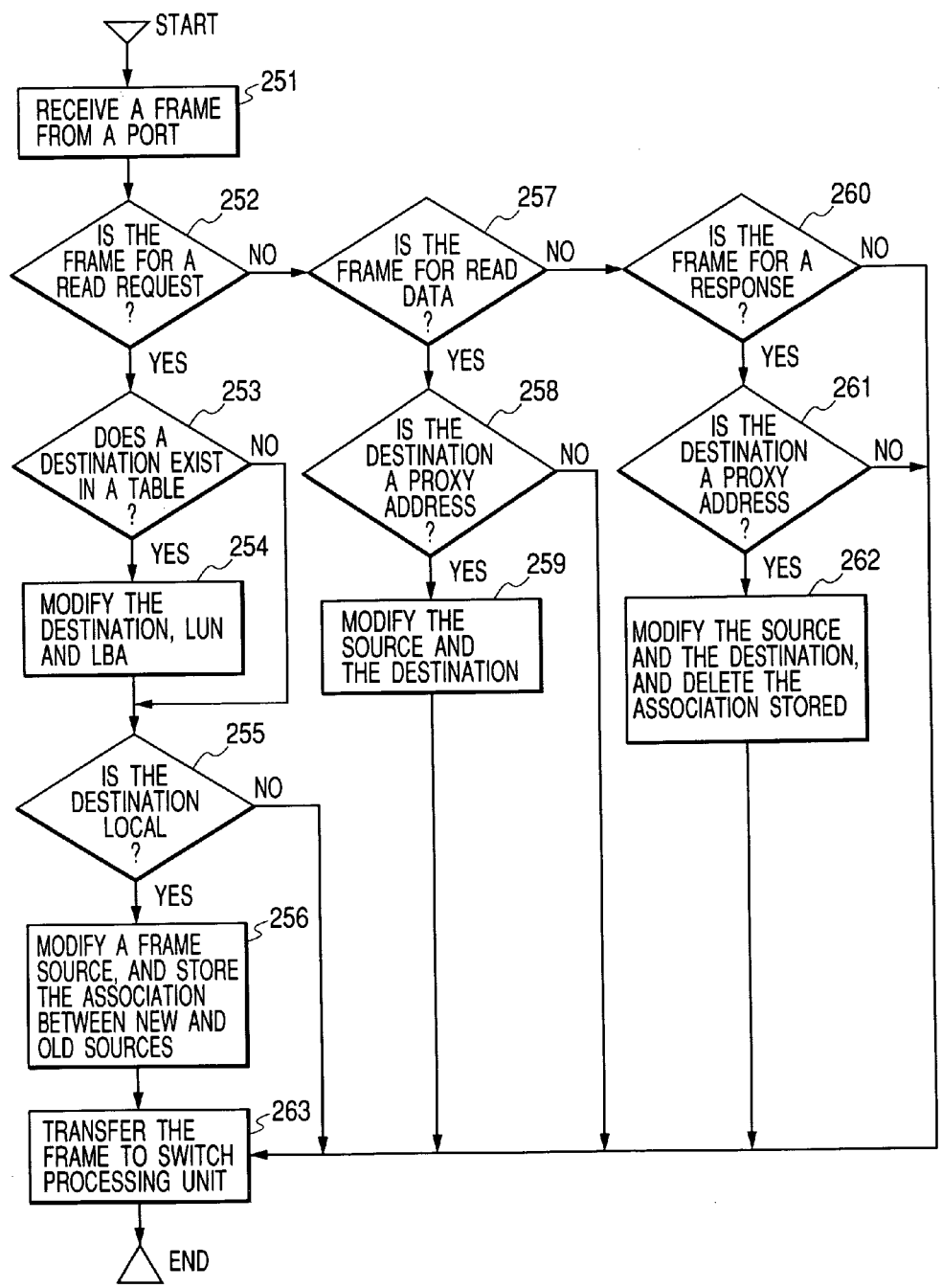
FIG. 8 is a flowchart illustrating address translation processing according to the second embodiment.

FIG. 8 is a flowchart illustrating an example of address translation processing by the CPU 1141 according to this embodiment. Here, an address translation program executed in the copy management switch 203 is called an address translation program 226.

The instant the port 111 receives a frame, the CPU 1141 starts execution of the address translation program 226 (step 251). The CPU 1141 judges whether or not the received frame is intended for a read request (step 252). If the received frame is intended for a read request, the CPU 1141 judges whether or not a copy of data requested by the read request exists in the computer system. To be more specific, the CPU 1141 judges whether or not the copy management table 231 has a copy management entry 232 satisfying a condition that an area indicated by the information stored in the field 133, the field 134, the field 135, and the field 136, which are included in the copy management entry 232, includes an area indicated by a destination SAN address, a LUN, a LBA, and a length which are stored in the frame containing the read request (step 253).

If there exists the copy management entry 232 that satisfies the condition described in step 253, the CPU 1141 uses the copy management entry 232, which has been found in step 253, to convert the read request into a read request to the storage device 104 that stores copy data. To be more specific, a destination of the frame containing the read request is changed to a copy SAN address stored in the field 137; a LUN of the frame is changed to a copy LUN stored in the field 138; and a LBA of the frame is changed to a value determined by (a LBA+ a value of a copy LBA stored in the field 139– a value of an original LBA stored in the field 135) (step 254).

If a destination of the frame is not included in the copy management table 231 in step 253, or if the frame is converted into the read request to the storage device 104 that stores the copy data, then the CPU 1141 judges whether or not the read request is issued to the storage device 104 that is connected to the copy management switch 203 to which the CPU 1141 belongs. More specifically, to begin with, a judgment is made as to whether or not an area indicated by a SAN address, a LUN, a LBA, and a length, of a destination of the read request is included in an area indicated by the copy SAN address 137, the copy LUN 138, the copy LBA 139, and the original length 136 of a copy management entry 232 in the copy management table 231. A further judgment is then made as to whether or not the pertinent copy management entry 232 has a value of 1 in the local flag 240 (step 255).

If the copy management entry 232 in which the local flag is 1 exists, the CPU 1141 changes a source of the frame containing the read request. The reason for the change is to differentiate between a read request for the copy data and a read request for data other than the copy data held by the storage device 104. To be more specific, the CPU 1141 first generates a proxy SAN address. The proxy SAN address is determined such that it includes a SAN domain address assigned to the copy management switch 203, and that it does not overlap SAN addresses of the other nodes and also does not overlap a proxy SAN address stored in the field 245 of the proxy address entry 242 held in the proxy address table 241.

Next, the CPU 1141 writes, to the proxy address entry 242 that is not used in the proxy address table 241, the association with a host SAN address corresponding to the host 105 that has issued the read request, an original SAN address, and a proxy address. To be more specific, by use of the copy management entry 232 found in step 255, the CPU 1141 stores the host SAN address indicating the host 105 as a source of the read request in the field 243, stores the original SAN address 133 in the field 244, and stores the generated proxy SAN address in the field 245. The CPU 1141 then changes a source of the frame, which is the read request, to the generated proxy address (step 256).

If it is judged in step 252 that the received frame is not intended for a read request, the CPU 1141 judges whether or not the received frame is intended for read data (step 257). If the received frame is intended for read data, the CPU 1141 judges whether or not a destination of the read data is a proxy SAN address generated by the copy management switch 203. More specifically, the CPU 1141 judges whether or not the proxy address table 241 includes the proxy address entry 242 in which a SAN address pointing to a destination of the read data agrees with a proxy SAN address stored in the field 245 (step 258).

If the proxy address entry 242 satisfying the condition is found, the CPU 1141 uses information stored in the proxy address entry 242, which has been found in step 258, to change the source of the frame to an original SAN address stored in the field 244, and also to change the destination to the host SAN address stored in the field 243 (step 259).

If it is judged in step 257 that the received frame is not intended for read data, the CPU 1141 judges whether or not the received frame is intended for a response (step 260). If the frame is intended for a response, the CPU 1141 judges whether or not a destination of the frame is a node indicated by the proxy SAN address generated by the copy management switch 203. More specifically, the CPU 1141 judges whether or not the proxy address table 241 includes the proxy address entry 242 in which a SAN address pointing to a destination of the frame agrees with the proxy SAN address stored in the field 245 (step 261).

If the proxy address entry 242 satisfying the condition is found in step 261, the CPU 1141 uses information stored in the found proxy address entry 242 to change the source of the frame to an original SAN address stored in the field 244, and also to change the destination to the host SAN address stored in the field 243. In addition, the CPU 1141 deletes the proxy address entry 242 from the proxy address table 241 (step 262).

If the destination of the frame does not satisfy the condition shown in step 255, if the destination of the frame is not judged to be the proxy SAN address in step 258 or 261, or if address translation of the frame is completed in step 256, 259, or 262, the CPU 1141 transmits the frame completing the processing to the switch processing unit 115 (step 263).

A series of operation of the computer system according to this embodiment will be summarized as below.

The user or administrator of the system uses the management terminal 106 to instruct the copy management switch 103 to perform data copy and store the information in the copy management table 231 of each copy management switch.

The host 105 issues a read request to the storage device 104a. The read request includes a SAN address, a LUN, a LBA, a length, of the storage device 104a as a destination, and a SAN address of the host 105 as a source. The read request is routed according to the SAN address of the destination, and thereby arrives at the copy management switch 203a via the switch 102a.

On receiving the read request, the copy management switch 203a checks the read request against information in the copy management table 231. The copy management switch 203a converts a destination of the read request into a read request for copy data held in the storage device 104b, and then routes the converted read request. However, because the storage device 104*b* is not connected to the copy management switch 203*a*, a proxy address is not generated, nor is the source changed.

The modified read request is routed according to a SAN address of the destination, and consequently arrives at the copy management switch 203*b*. The copy management switch 203*b* which has received the read request checks contents of the received frame against information in the copy management table 231. As a result, the copy management switch 203*b* generates a proxy SAN address, and then writes the association among a SAN address of the host 105, a SAN address of the storage device 104*a* as an original, and the proxy SAN address to the proxy address entry 242 of the proxy address table 241. After that, the copy management switch 203*b* changes a source of the read request to the proxy SAN address before routing the frame.

The storage device 104*b* which has received the read request reads out copy data corresponding to the read request, and after changing the destination to the proxy SAN address, the storage device 104*b* transmits the read data to the copy management switch 203*b*. The frame containing the read data includes the proxy SAN address as a destination, and a SAN address of the storage device 104*b* as a source.

The instant that the frame containing the read data arrives at the copy management switch 203*b*, the copy management switch 203*b* changes a source of the read data to a SAN address of the storage device 104*a*, and also changes a destination to a SAN address of the host 105, on the basis of information in the proxy address table 241.

After that, the frame containing the read data is routed according to the SAN address of the destination, and consequently arrives at the host 105 via the switch 102*a*. The host 105 receives the read data as if it were transmitted from the storage device 104*a*.

On the other hand, the instant that a response from the storage device 104*b* arrives at the copy management switch 203*b*, the copy management switch 203*b* changes a source to a SAN address of the storage device 104*a*, and also changes a destination to a SAN address of the host 105, before routing the response. At the same time, the copy management switch 203*b* deletes from the proxy address table 241 the proxy address entry 242 that stores the association. The host 105 receives the response as if it were transmitted from the storage device 104*a*.

In this embodiment, the copy management switch 203*a* exists on a path from the host 105 to the storage device 104*a* holding the original data. However, in contrast to the first embodiment, the storage device 104*b* holding the copy data is not connected to the copy management switch 203*a*. Nevertheless, in this embodiment, the read request is converted into a read request to the storage device 104*b* holding the copy data, and subsequently arrives at the copy management switch 203*b* to which the storage device 104*b* holding the copy data is connected. As a result, the copy data is transmitted to the host 105 as read data from the storage device 104*a*.

Additionally, in this embodiment, using a proxy SAN address makes it possible to differentiate a read request changed by the copy management switch 203 from a command such as a read request issued to the storage device 104*b* holding copy data. Hence, the storage device 104*b* having the copy data can be used as a usual storage device 104*b*. Moreover, because each read request uses a unique proxy SAN address, it becomes possible to copy the original data held in a plurality of storage devices 104 to one storage device 104*b*, and then to use the copied data as copy data.

Incidentally, in this embodiment, the proxy SAN address is used to classify read data from the storage device 104 into read data whose address information is required to be translated, and read data whose address information is not required to be translated. However, if information that enables recognition of the association among a read request, read data, and a response is added to a frame, it is also possible to classify the read data by the additional information without using the proxy SAN address.

For example, in the fiber channel protocol, an ID called an exchange ID is added to each frame. Accordingly, it is also possible to classify the read data and the response according to this information.

Figure 9:
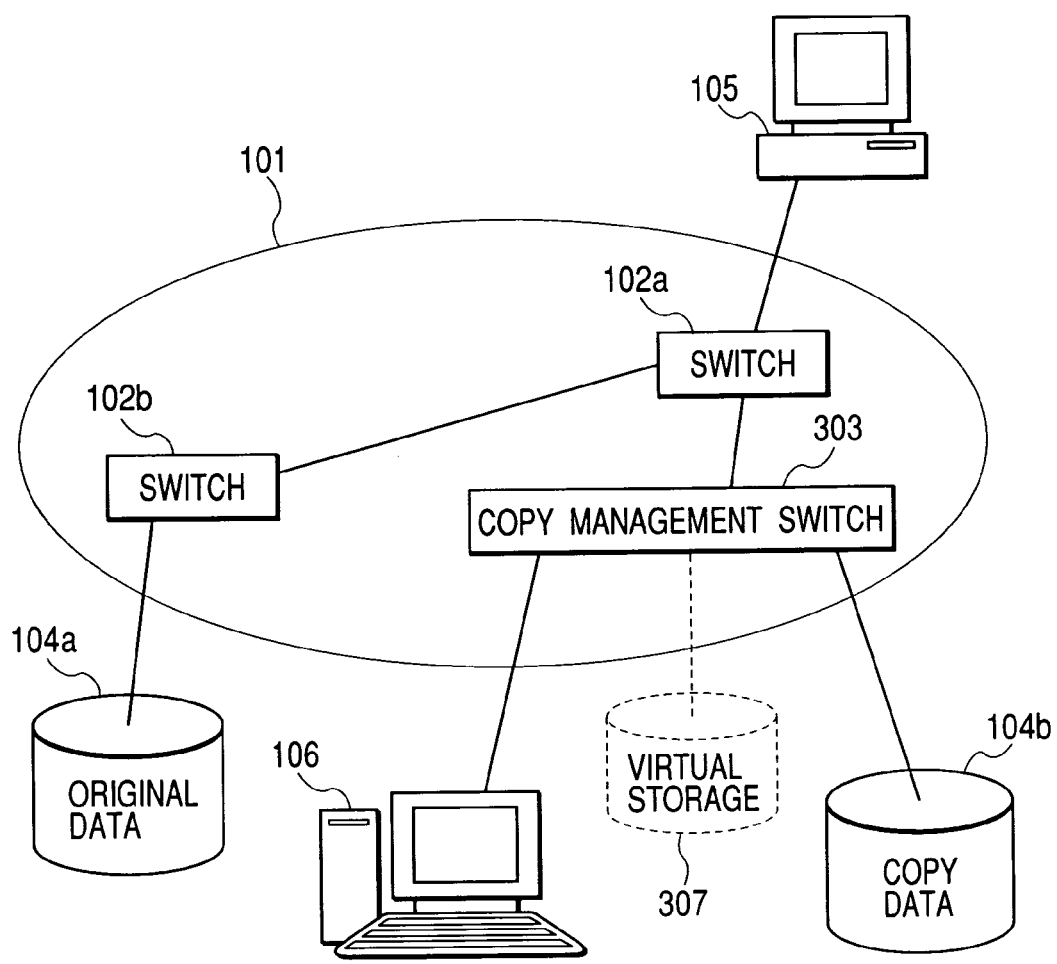
FIG. 9 is a diagram illustrating a configuration of a computer system according to a third embodiment of the present invention.

FIG. 9 is a diagram illustrating a configuration example of a computer system to which a third embodiment according to the present invention is applied. A SAN 101 comprises switches 102*a*, 102*b* and a copy management switch 303. In addition, a host 105, a storage device 104*a*, and a storage device 104*b* are connected to the SAN 101. Original data is stored in the storage device 104*a*.

It should be noted that this embodiment also based on the assumption that a connection cost for a communication line between the host 105 and the storage device 104*a* is higher than that for a communication line between the host 105 and the storage device 104*b*.

As is the case with the other embodiments described above, the user, or the administrator, of the system uses the management terminal 106, which is connected to the copy management switch 303, to copy original data, and then to write information about the association of the original data with the copy data to the copy management table 231 of the copy management switch 303 for the purpose of managing the information. In this embodiment, in addition to the copy management table 231, a virtual address table 341, which will be described below, is also stored and managed.

Using the method described below, the copy management switch 303 works for a device connected to the copy management switch 303 as if there were a virtual storage device 104 (hereinafter referred to as a "virtual storage 307").

In this embodiment, the host 105 thereafter judges that the original data is stored in the virtual storage 307, and thereby issues a read request to the virtual storage 307. The reason why the read request is issued to the virtual storage 307 is as follows: because copy management entries 232*a* and 232*b* described below are stored in the copy management switch 303 through the management terminal 106, the copy management switch 303 changes a read request to the virtual storage 307 into a read request to the storage device 104*a* or the storage device 104*b* depending on the presence or absence of copy data. This enables effective use of the network. It is to be noted that a WWN of the virtual storage 307 is applied to the host 105. The host 105 uses a name service to know two SAN addresses of the virtual storage 307 judging from the WWN of the virtual storage 307.

In this connection, a configuration of the copy management switch 303 in this embodiment is the same as the copy management switch 103 in the first embodiment. However, as far as the information, etc. stored in the memory of the copy management switch 303 are concerned, there are points of difference from the second embodiment as below.

A first point of difference is that the CPU 1121 executes an initialization program 321 (the initialization program 121 used for the copy management switch 303) to read the virtual address table 341 described below from the nonvolatile storage 1123, and then to write to the name database 125 the address information of the virtual storage 307 stored in the virtual address table 341. A second point of difference is that the CPU 1121 executes a management-terminal-submitted request processing program 322 (the request processing program 122 used for the copy management switch 303) not only to perform the processing in the second embodiment, but also to change the virtual address table 341 held in the non-volatile storage 1123 in response to a request that comes from the management terminal 106 and is received by the management port 113.

Figure 10:
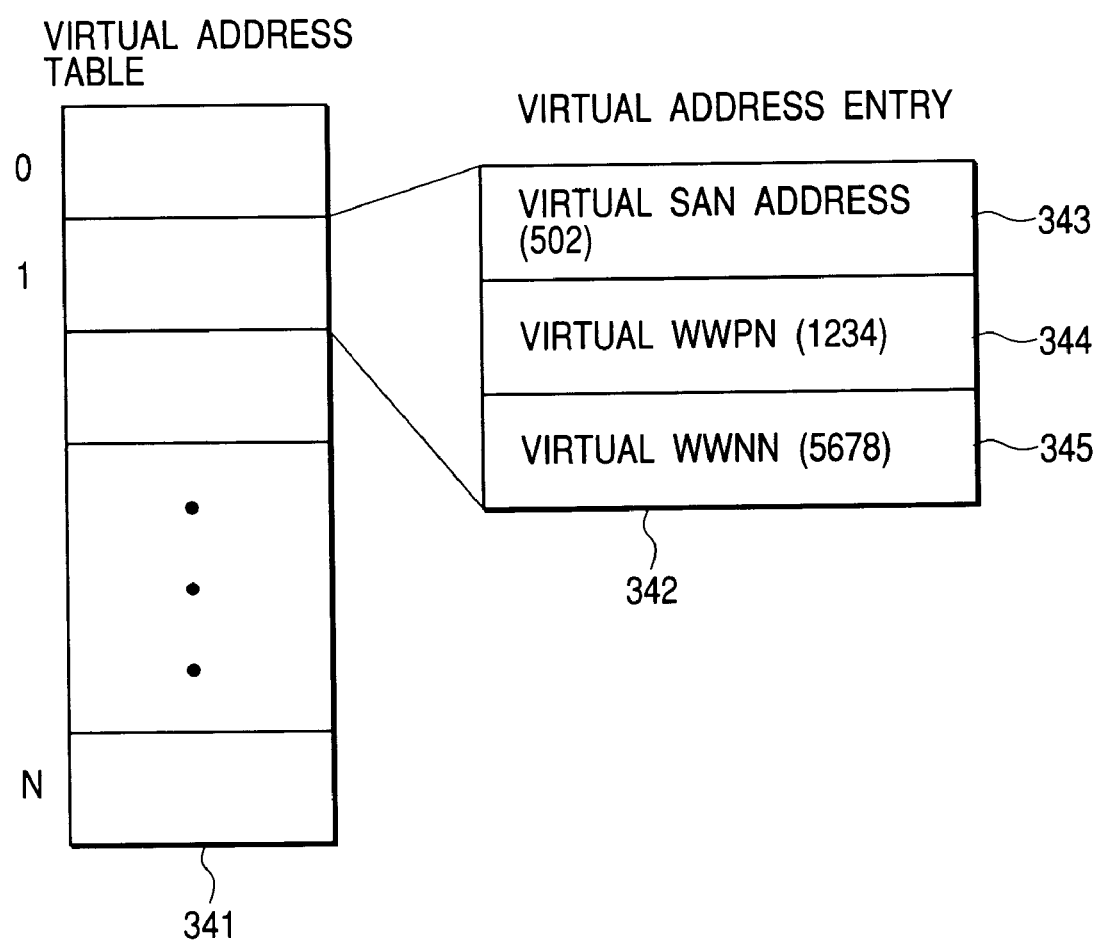
FIG. 10 is a diagram illustrating a configuration of a virtual address table according to the third embodiment.

FIG. 10 is a diagram illustrating contents of the virtual address table 341. The virtual address table 341 comprises a plurality of virtual address entries 342. The virtual address entry 342 corresponds to one virtual node, for instance, the virtual storage 307. A SAN address of the virtual node (hereinafter referred to as a "virtual SAN address") and a virtual WWN (hereinafter referred to as a "virtual WWPN" and a "virtual WWNN") are written to entries 343, 344, and 345 of the virtual address entry 342.

It is to be noted that the copy management table 231 and the proxy address table 241 used in this embodiment are the same as those used in the second embodiment. The address translation program 226 is also the same as that used in the second embodiment.

A series of operation of the computer system according to this embodiment will be summarized as below.

In the first place, the user or administrator of the system uses the management terminal 106, which is connected to the copy management switch 303, to instruct the copy management switch 303 to copy original data stored in the storage device 104a to the storage device 104b. Subsequently, the virtual address table 341 and the copy management table 231 are set. FIGS. 10 and 11 illustrate values set in the copy management table 231, the copy management entries 232a, 232b, the virtual address table 341, and the virtual address entry 342. The values are set as follows: a SAN domain address of the switch 102a is 4; a SAN domain address of the copy management switch 303 is 5; a SAN address of the storage device 104a is 401; a SAN address of the storage device 104b is 501; a SAN address assigned to the virtual storage device 307 is 502; a WWPN is 1234; and a WWNN is 5678. In this case, original data is stored in an area having a length of 100000 and starting from LUN 0 and LBA 0 of the storage device 104a, and then part of the original data, starting from the top of the original data and having a length of 50000, is copied to an area starting from LUN 0 and LBA 0 of the storage device 104b. The copy management entry 232a shows that a read request to read an area having a length of 50000 and starting from LUN 0 and LBA 0 of the virtual storage 307 is converted into a read request to the storage device 104b. On the other hand, the copy management entry 232b shows that a read request to read an area having a length of 50000 and starting from LUN 0, LBA 50000 of the virtual storage 307 is converted into a read request to the storage device 104a.

After the settings end, the host 105 issues a read request to the virtual storage 307. A frame of the read request includes a SAN address, LUN, LBA, a length, of the storage device 307 as a destination, and a SAN address of the host 105 as a source. The frame of the read request is routed according to the SAN address of the destination, and consequently arrives at the copy management switch 303 via the switch 102a.

The copy management switch 303 that has received the read request checks information included in the frame of the read request against information in the copy management table 231. As a result of the check, if the read request matches the copy management entry 232a, as is the case with the second embodiment, the copy management switch 303 changes a destination of the read request, and thereby converts the read request into a read request to the storage device 104b having copy data. Further, the copy management switch 303 generates a proxy address to change a source to the proxy address, and then transmits to the storage device 104b a frame containing the read request. After that, the copy management switch 303b writes the association among the host 105, the virtual storage 307, and the proxy address to the proxy address entry 242 of the proxy address table 241. Moreover, if the read request matches the copy management entry 232b as a result of the check, the read request is converted into a read request for the original data stored in the storage device 104a, and similar processing is performed thereafter.

The storage device 104b that has received the read request reads out specified data, and then sets the proxy SAN address as a destination before transmitting the read data. A frame of the read data includes the proxy SAN address indicating the destination, and a SAN address of the storage device 104b as a source.

On receiving the frame of the read data, the copy management switch 303 changes a source of the frame of the read data to a SAN address of the virtual storage 307, and also changes a destination to a SAN address of the host 105, on the basis of information in the proxy address table 241. The read data is routed according to the SAN address of the destination, and consequently arrives at the host 105 via the switch 102a. The host 105 receives the read data as if it were transmitted from the virtual storage 307.

In the first and second embodiments, the copy management switch 103 and the like exist on a network path (hereinafter referred to as a "path") between the host 105 and the storage device 104a holding the original data, and the copy management switch 103 or the like changes the frame of the read request. However, because the copy management switch 303 provides the virtual storage 307 in this embodiment, a read request directly arrives at the copy management switch 303 that does not exists on the path between the host 105 and the storage device 104a.

Figure 12:
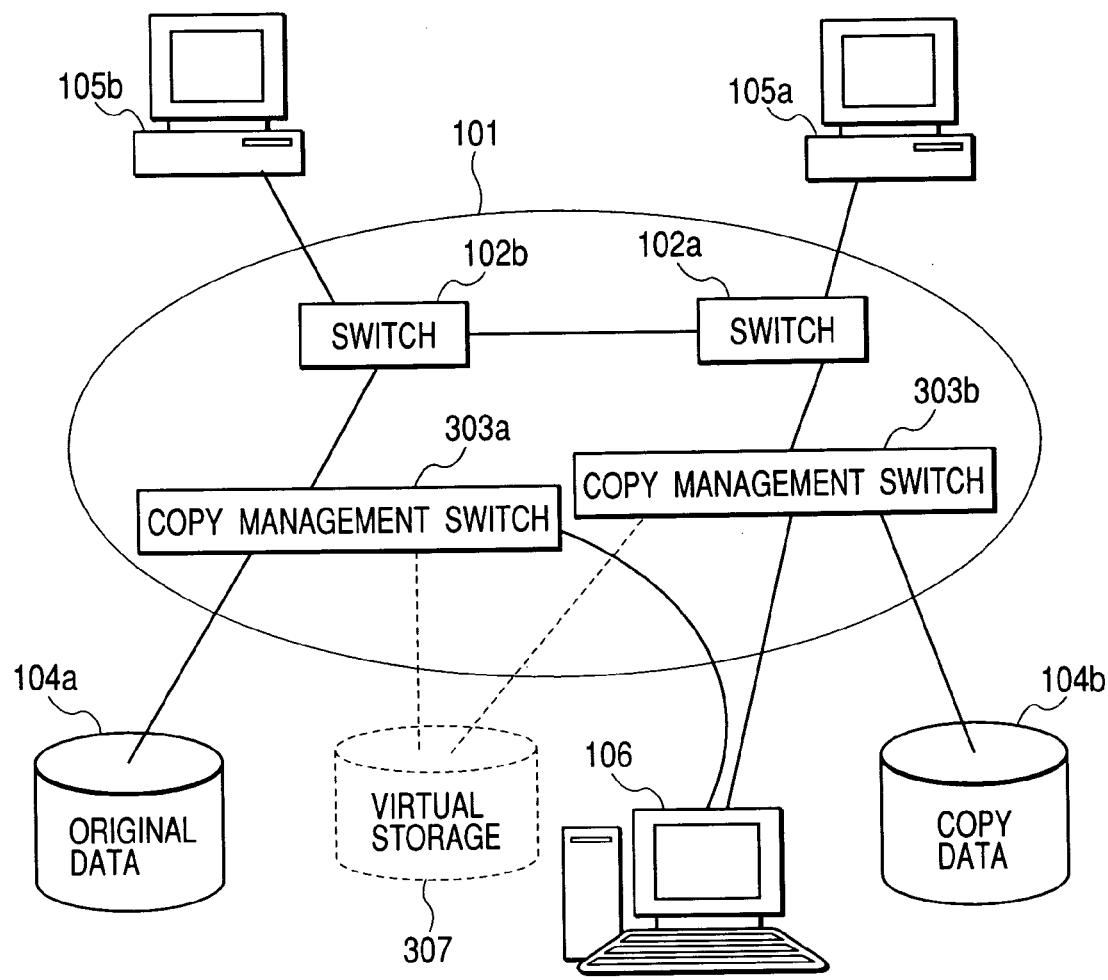
FIG. 12 is a diagram illustrating a configuration example in which a plurality of copy management switches are provided in the third embodiment.

Furthermore, the present embodiment can employ another configuration as shown in FIG. 12.

In this configuration, a storage device 104a is connected to a copy management switch 303a. The administrator or the like uses a management terminal 106 to set a copy management table 231 and a virtual address table 341 of the copy management switches 303a, 303b so that each copy management switch provides a virtual storage 307.

In this case, the virtual address entry 342 whose WWNN is equivalent is written to the virtual address table 341 of the copy management switches 303a, 303b so that when the hosts 105a, 105b refer to a name database of each of the copy management switches 303a, 303b, the virtual storage 307 is recognized as a node having a plurality of ports.

In the hosts 105a, 105b, the storage device 104 to be accessed is set by the WWNN. The hosts 105a, 105b refer to the name database, and thereby obtain two SAN addresses of the storage device 104 to be accessed (in actuality, the virtual storage 307). In this case, the host 105 can access the virtual storage 307 by use of any of the SAN addresses. Examples of methods for selecting one port from among a plurality of ports pointed by the plurality of SAN addresses could conceivably include two methods as described below.

One is that if the host 105 can obtain topology information of the SAN 101 from the switch 102 or the copy management switch 303, a port entailing a lower connection cost is selected, and then a read request is transmitted to the port.

The other is that if the host 105 cannot obtain topology information, the host 105 transmits a read request to both ports, and then a port which can make a faster access is selected from the both ports.

Incidentally, in the above-mentioned configuration, if the storage device 104b gets out of order when copying the whole original data to the storage device 104b, on the assumption that the copy management switch 303 can detect a failure of the storage device 104, it is possible to provide such fail-safe operation that changing the copy management entry 232 permits an access request to be routed to the safe storage device 104a.

There are several methods by which the copy management switch 303 can detect a failure of the storage device 104. For example, if an optical fiber is used as a communication line, the occurrence of a physical disconnection can be detected by extinction of light at the port 111. In addition, because a response from the storage device 104b includes error information, the copy management switch 303 can also detect a failure of the storage device 104 by monitoring contents of the response at the port 111. An example of fail-safe will be described below.

The copy management switch 303 that has detected a failure of the storage device 104 notifies the management terminal 106 of the occurrence of the failure. The user or the like then uses the copy management switch 303 to set again the copy management table 231 of the copy management switch 303. For example, if the storage device 104b in FIG. 9 gets out of order, the user uses the management terminal 106 to delete the copy management entry 232a of the copy management switch 303, then to set the original LBA 135b and copy LBA 139b of the copy management entry 232b at 0, and further, to set the original length 136b at 100000.

As a result, the copy management switch 303 routes all read requests, which are issued from the host 105 to the virtual storage 307, to the storage device 104a. Similar failover processing can be performed also in the first and second embodiments.

Moreover, in the configuration shown in FIG. 12, it is possible to realize the failover processing by changing a port selected by the host 105 depending on whether or not a timeout of the transmitted read request is encountered.

Figure 13:
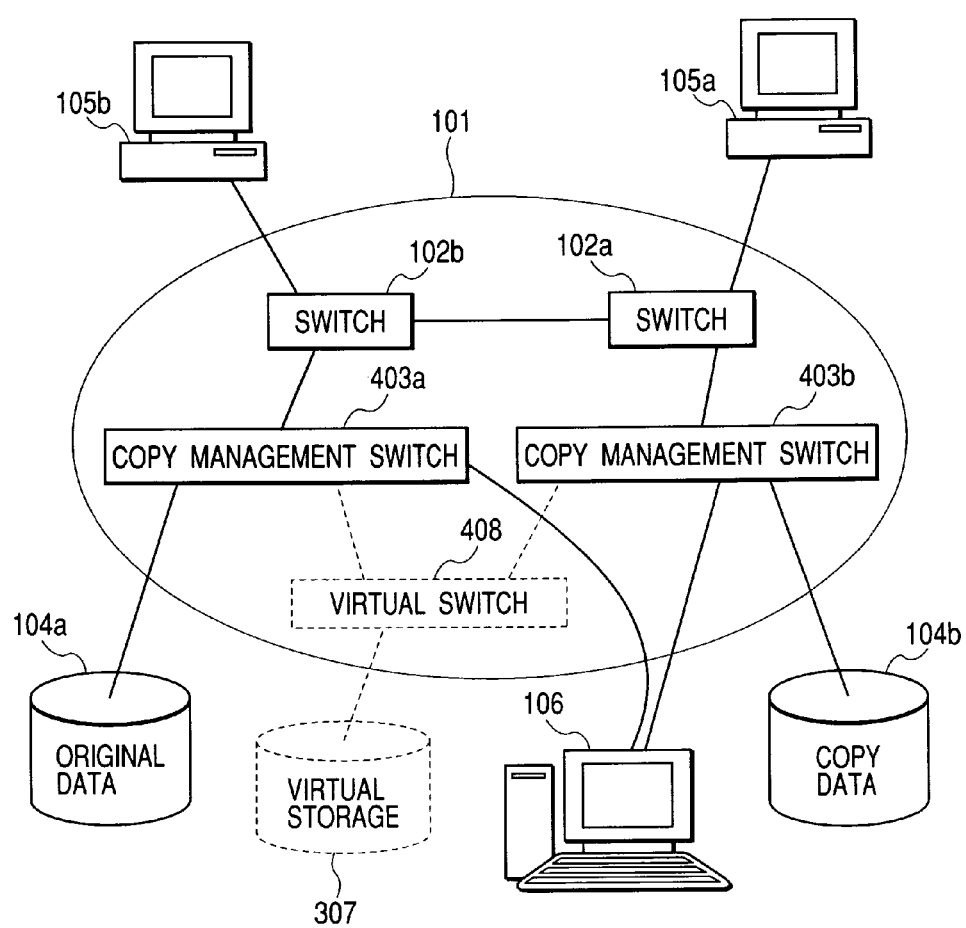
FIG. 13 is a diagram illustrating a configuration of a computer system according to a fourth embodiment of the present invention.

FIG. 13 is a diagram illustrating a configuration example of a computer system to which a fourth embodiment according to the present invention is applied. This embodiment is different from the third embodiment in that copy management switches 403a, 403b provide a virtual switch 408.

A configuration of each of the copy management switch 403a, 403b in this embodiment is similar to that of the copy management switch 303 in the third embodiment. However, information and the like stored in the memory 1122 possessed by each of the copy management switches 403a, 403b differ from those in the third embodiment in the following points:

Firstly, in addition to the virtual address table 341 in the third embodiment, an entry 446 for storing a virtual domain address is added to the virtual address table 441 (virtual address table 341 used for the copy management switch 403). A virtual domain address stored in the entry 446 indicates a SAN domain address of the virtual switch 408.

Secondly, the CPU 1121 executes the routing protocol processing program 423 (the routing protocol processing program 123 used for the copy management switch 403). The CPU 1121 then exchanges, with another switch, information about being connected to the virtual switch 408 having a SAN domain address specified by a virtual domain address stored in the entry 446, and thereby creates a routing table. In this case, in order to ensure consistency of routing, a connection cost between the copy management switch 403a and the virtual switch 408 and a connection cost between the copy management switch 403b and the virtual switch 408 are sets so that they are equivalent to each other.

A flow of a series of processing in this embodiment will be described below.

In the first place, the user or administrator of the system uses the management terminal 106 connected to the copy management switches 403a, 403b to issue to the copy management switch 403a (or 403b) an instruction to copy original data stored in the storage device 104a to the storage device 104b. Subsequently, the administrator or the like sets information in the virtual address table 441 and the copy management table 231 that are provided in each of the copy management switches 403a, 403b.

Here, in this embodiment, on the assumption that a SAN domain address of the copy management switch 403a is 4, a SAN domain address of the copy management switch 403b is 5, a SAN domain address of the virtual switch 408 is 8, a SAN address of the storage device 104a is 401, a SAN address of the storage device 104b is 501, a SAN address assigned to the virtual storage 307 is 801, a WWPN is 1234, and a WWNN is 5678, original data is stored in an area having a length of 100000 starting from LUN 0 and LBA 0 of the storage device 104a, and then part of the original data, starting from the top of the original data and having a length of 50000, is copied to an area starting from LUN 0 and LBA 0 of the storage device 104b.

Additionally, a connection cost between the host 105 and each of the copy management switches 403a, 403b is assumed to be as follows: for the host 105a, a connection cost between the host 105a and the copy management switch 403b is lower than a connection cost between the host 105a and the copy management switch 403a. For the host 105b, a connection cost between the host 105b and the copy management switch 403a is lower than a connection cost between the host 105b and the copy management switch 403b.

When the host 105a issues a read request to the virtual storage 307, the read request arrives at the copy management switch 403b as a result of the routing that can achieve the lowest connection cost. After that, processing which is the same as that in the third embodiment is performed.

When the host 105b issues a read request to the virtual storage 307, the read request arrives at the copy management switch 403a, and then processing which is the same as that in the third embodiment is performed.

According to this embodiment, the host 105 can transmit a read request to the copy management switch 403 whose connection cost is low without selecting a path as performed in the configuration in FIG. 12. This reason is that since a connection cost between the copy management switch 403a and the virtual switch 408 is equivalent to a connection cost between the copy management switch 403b and the virtual switch 408, a frame which is transmitted from the host 105 to a SAN domain of the virtual switch 408 arrives at the copy management switch 403a or 403b that is closest to the host 105.

Figure 14:
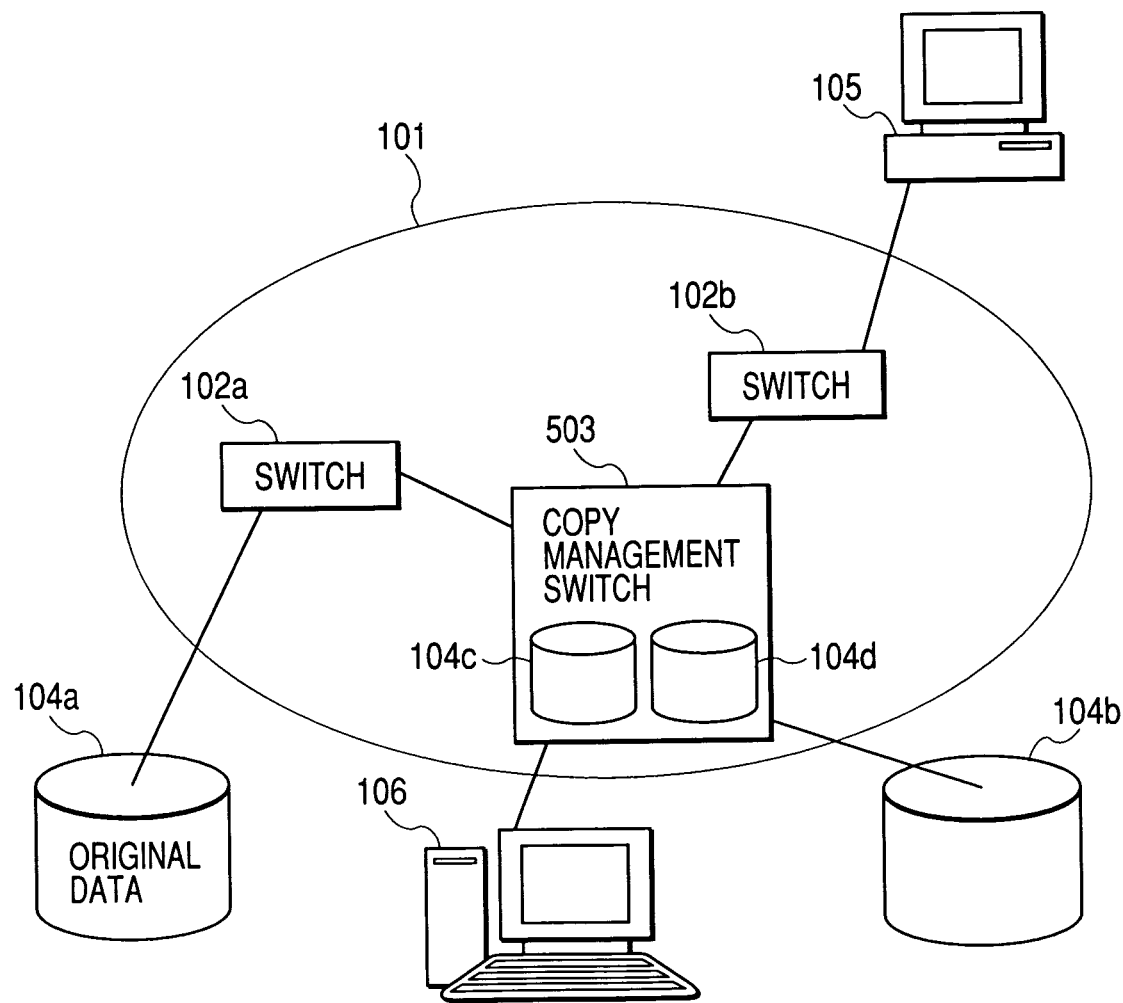
FIG. 14 is a diagram illustrating a configuration of a computer system according to a fifth embodiment of the present invention.

FIG. 14 is a diagram illustrating a configuration example of a computer system to which a fifth embodiment according to the present invention is applied. This embodiment is different from the first embodiment in that a copy management switch 503 has storage devices 104c, 104d.

In this embodiment, the storage device 104a holds original data, and the host 105 issues a read request for the original data. Additionally, in this embodiment, the copy management switch 503 holds copy data. On receipt of the read request for the original data, which is issued from the host 105, the copy management switch 503 reads out the copy data held in the storage devices 104*c*, 104*d*, and then transmits the read data to the host 105.

Figure 15:
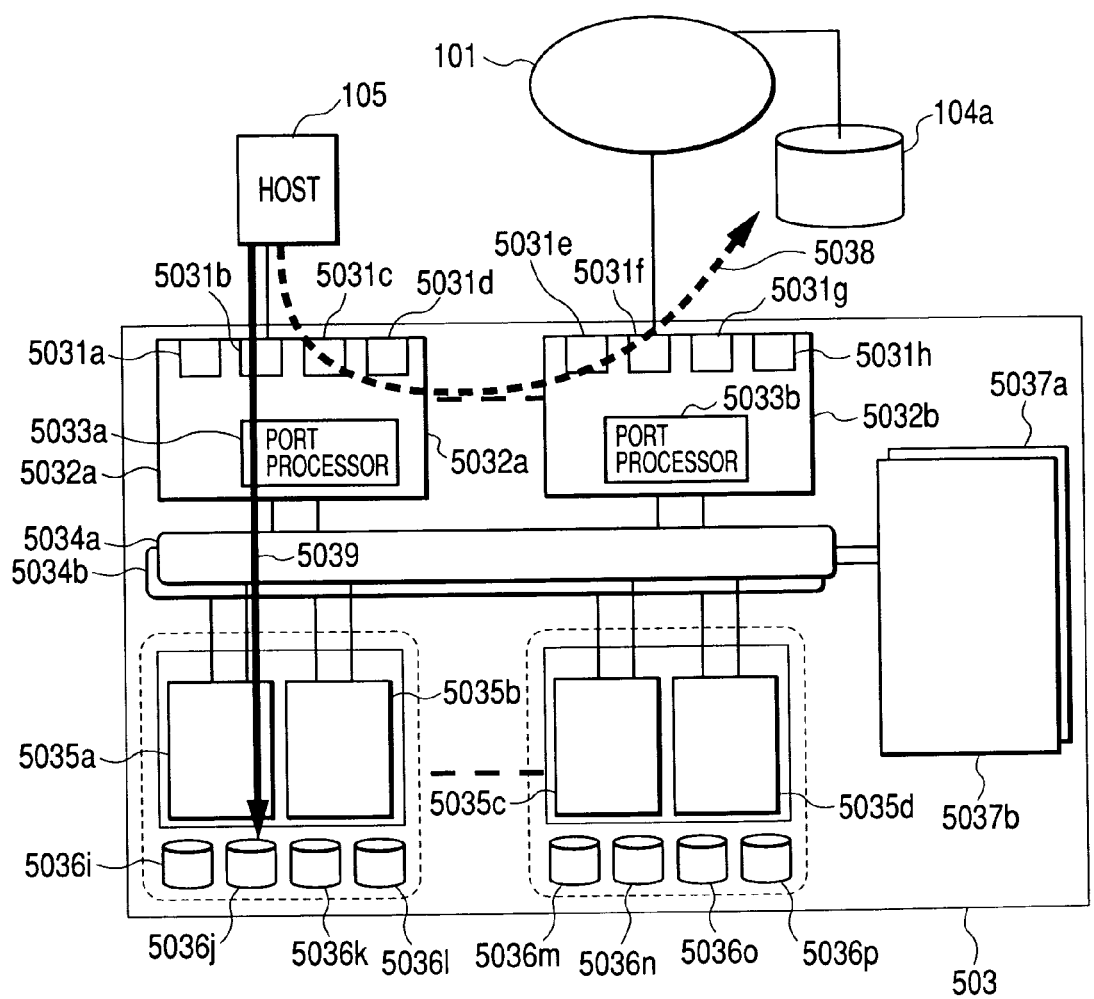
FIG. 15 is a diagram illustrating a configuration example of a copy management switch.

FIG. 15 is a diagram illustrating a specific example of an internal configuration of the copy management switch 503.

The copy management switch 503 comprises the following: a protocol converter 5032 including a plurality of ports 5031 and a port processor 5033; a disk controller 5035; a hard disk 5036; a management unit 5037; and a switch unit 5034 for connecting these components. The port processor 5033 includes a CPU and a memory; and the management unit 5037 includes a CPU, a memory, and a storage device.

The disk controller 5035 provides another device with the storage capacity, which is obtained from a plurality of hard disks connected to the disk controller 5035, as one or a plurality of logical storage areas.

The copy management switch 503 gathers the logical storage areas, which are provided by the plurality of disk controllers 5035 included in the copy management switch 503 itself, into one or a plurality of virtual storage areas, and then provides the virtual storage area or areas to a device connected to the copy management switch 503.

The copy management switch 503 transmits/receives a command and data to/from other nodes through the ports 5031. The protocol converter 5032, which has received the command, and the like, through the port 5031, converts a protocol used for the command and the data which have been received, and then transmits them to the switch unit 5034. Here, the protocol converter 5032 judges whether or not the received command is targeted for the virtual storage area provided by the copy management switch 503. If the received command is targeted for its own storage area, the protocol converter 5032 issues a command to the disk controller 5035 corresponding to the storage area. If the received command is not targeted at its own storage area, the protocol converter 5032 transmits a received frame to the switch unit 5034 just as it is.

Information indicating the association of the virtual storage area provided by the copy management switch 503 with the logical storage area provided by the disk controller 5035 is stored in the storage device of the management unit 5037. In addition, when the copy management switch 503 is started-up, the CPU of the management unit 5037 stores this information in a memory possessed by the port processor 5033. Further, the management unit 5037 holds a name database in a memory inside the management unit 5037, and thereby executes, in the CPU inside, processing that responds to an inquiry about WWNN and the like.

The switch unit 5034 performs routing according to address information of the frame.

The disk controller 5035 holds, in an internal memory, information about the association between the logical storage area to be provided and the storage area included in each hard disk 5036 connected. On receipt of a command from the switch unit 5034 (here, the command is stored in the frame), the disk controller 5035 determines a hard disk 5036 corresponding to a storage area specified by the command, and also a stored location in the hard disk 5036, using the information about the association held in the memory. Then, the disk controller 5035 issues a data read command and the like to the corresponding hard disk 5036 so that the command is handled.

Incidentally, the reason why the switch unit 5034, the disk controller 5035, and the management unit 5037 are duplicated in FIG. 15 is to achieve redundancy so that reliability is improved. Hence, this configuration is not always required for the present invention.

In the copy management switch 503 according to this embodiment, the address translation program 126 is stored in a memory possessed by the port processor 5033 of the protocol converter 5032. If the port 5031 of the protocol converter 5032 receives a frame, or if the switch unit 5034 receives a frame, the address translation program 126 is executed in the port processor 5033*a*. In addition, a memory in the management unit 5037 stores the programs that are stored in the memory 1122 described in the first embodiment.

A flow of a series of processing executed in the computer system according to this embodiment will be described below.

To begin with, the host 105 issues a read request for original data held in the storage device 104*a*.

On receiving the read request, the protocol converter 5032 of the copy management switch 503 first executes the address translation program 126 in the port processor 5033, and then converts a received frame containing the read request into a frame containing a read request for a storage area that stores copy data.

The protocol converter 5032 then checks contents of the read request converted. In this embodiment, the read request is targeted for the storage area provided by the copy management switch 503. Accordingly, the protocol converter 5032 transmits the converted frame containing the read request to the disk controller 5035.

The disk controller 5035 that has received the read request through the switch unit 5034 reads out specified data from the hard disk 5036 according to the received read request, and then transmits the read data to the protocol converter 5032 through the switch unit 5034.

The protocol converter 5032 which has received the read data executes the address translation program 126 using the port processor 5033, and thereby changes a source of the read data to a SAN address of the storage device 104*a*. Then, the protocol converter 5032 transmits the changed frame containing the read data to the host 105 through the port 5031. The host 105 receives the read data as if it were transmitted from the storage device 104*a*.

In this manner, the read request for the original data stored in the storage device 104*a*, which has been issued from the host 105, is handled by the copy management switch 503 using the copy data stored in the storage area that is provided by the copy management switch 503.

In this embodiment, the storage area provided by the copy management switch 503 is used to hold the copy data. However, the copy management switch 503 in this embodiment can be used in the same manner as the copy management switch 103 described in the above-mentioned embodiments, i.e., from the first to fourth embodiments.

Next, a sixth embodiment of the present invention will be described below. In the above-mentioned embodiments, i.e., from the first to fifth embodiments, the whole original data or a specified part of the original data is copied. Moreover, according to an instruction by the administrator or the like, data is copied concurrently with the settings of the copy management tables 131, 231. However, in the sixth embodiment describe here, according to a read request from the host 105, a copy management switch 703 described below copies data, which is a target of the read request, from the storage device 104*a* storing original data to the storage device 104*b* specified. The operation performed in this manner enables efficient use of the storage capacity possessed by the storage device 104*b*.

A configuration of a computer system in the sixth embodiment is the same as that in the first embodiment except that the copy management switch 103 is replaced by the copy management switch 703.

In this embodiment, this embodiment is different from the first embodiment in information and the like stored in memories 1122, 1142 of the copy management switch 703 in a manner described below. Firstly, the CPU 1121 executes the initialization program 721 to create a cache table 741 corresponding to a cache index 737 of each copy management entry 732 of a copy management table 731 described later. The cache table 741 will be described later. Secondly, the CPU 1121 executes a management-terminal-submitted request processing program 722 (the management-terminal-submitted request processing program 122 used for the copy management switch 703), and in response to an addition or deletion of the cache index 737 resulting from the change of contents of the copy management table 731, the cache table 741 is added or deleted.

Thirdly, the CPU 1141 executes the address translation program 726 (the address translation program 126 used for the copy management switch 703). When the port 111 receives a frame, the CPU judges address information included in a read request, and then instructs the controller 112 to execute a cache processing program 727. Moreover, the CPU 1141 translates the address information about read data and the like. Details in the series of processing will be described later.

Fourthly, the CPU 1121 executes the cache processing program 727, and then, by use of the cache table 741, makes a judgment as to whether or not there exists copy data corresponding to the read request for the original data. If the copy data exists, then the CPU 1121 issues a read request to the storage device 104 storing the copy data (in this case, the storage device 104*b*). On the other hand, if the copy data does not exists, the CPU 1121 copies the original data, which is specified by the read request, from the storage device 104*a* to the storage device 104*b*, and then transmits the copy data to the host 105. Details in the series of processing will be described later.

Figure 16:
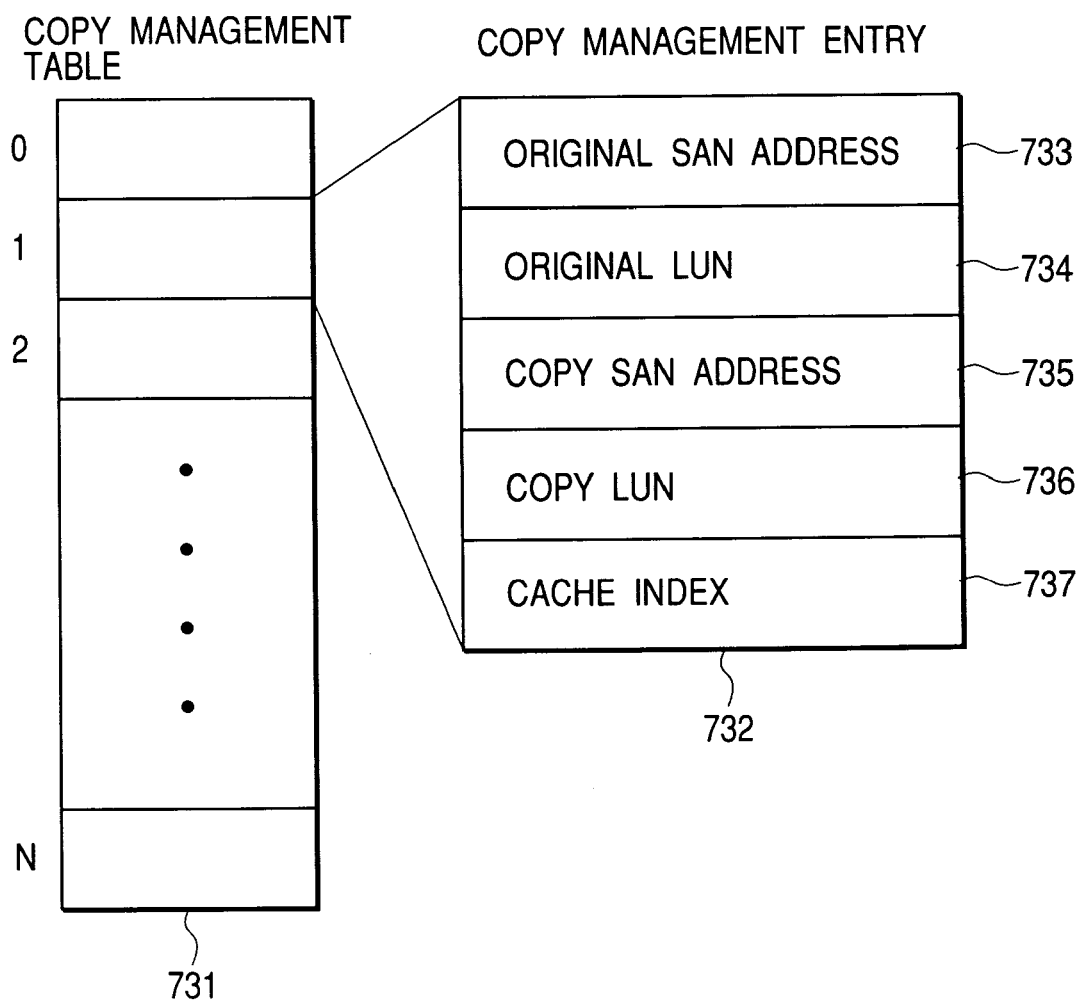
FIG. 16 is a diagram illustrating a configuration of a copy management table according to a sixth embodiment.

FIG. 16 is a diagram illustrating the configuration of the copy management table 731. The copy management table 731 has a plurality of copy management entries 732. In contrast to the first embodiment, each copy management entry 732 uses a SAN address and a LUN to manage the association between a stored location of original data and a location to which data is copied. To be more specific, each copy management entry 732 comprises an entry 733 for storing an original SAN address, an entry 734 for storing an original LUN, an entry 735 for storing a copy SAN address, an entry 736 for storing a copy LUN, and an entry 737 for storing cache index information. In other words, the copy management entry 732 specifies: the storage device 104*a* that stores original data; a LUN of the original data; the storage device 104*b* used to store copy data; and a LUN prepared for the copy data.

It should be noted that the cache index is information used to specify the cache table 741 described below.

Figure 17:
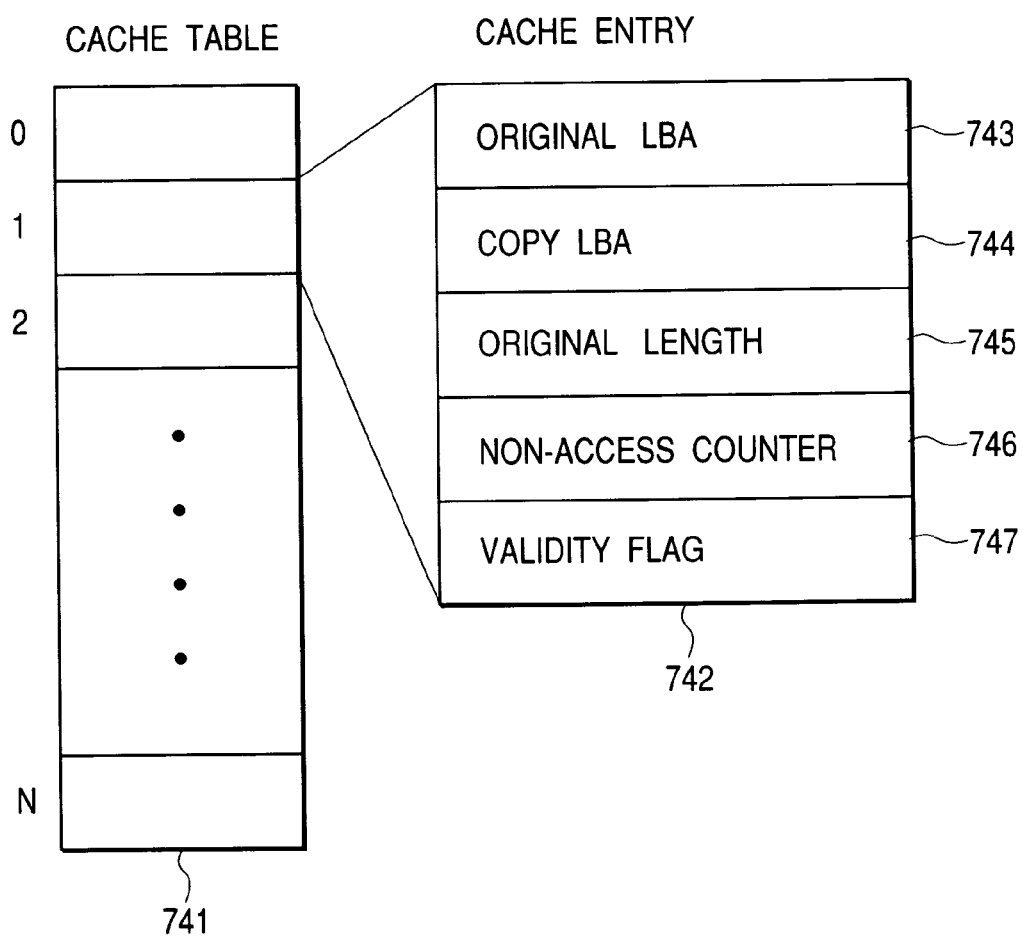
FIG. 17 is a diagram illustrating a configuration of a cache table according to the sixth embodiment.

FIG. 17 is a diagram illustrating an example of how the cache table 741 is configured. The number of the cache tables 741 is equivalent to the number of the copy management entries 732 used in the copy management table 731. The cache table 741 is associated with the copy management table 731 on the basis of a cache index stored in the entry 737. Each cache table 741 has a plurality of cache entries 742. The number of the cache entries 742 in each cache table 741 is determined by the capacity of the memory 1122, and the like, when the system is designed.

The cache entry 742 comprises an entry 743 for storing an original LBA, an entry 744 for storing a copy LBA, an entry 745 for storing an original length, an entry 746 for storing a non-access counter, and an entry 747 for storing a validity flag.

The non-access counter is a counter used in the cache processing program 727. How the non-access counter is used will be described later. The validity flag indicates that the cache entry 742 to which the validity flag belongs is valid or invalid. For instance, if the validity flag is 1, it indicates that the cache entry 742 is valid; and if the validity flag is 0, it indicates that the cache entry 742 is invalid.

In other words, the valid cache entry 742 (that is to say, 1 is stored in the entry 747) indicates that a storage area of the storage device 104*a*, starting from the original LBA and having a length of the original length, is copied to a storage area of the storage device 104*b*, starting from the copy LBA.

Figure 18:
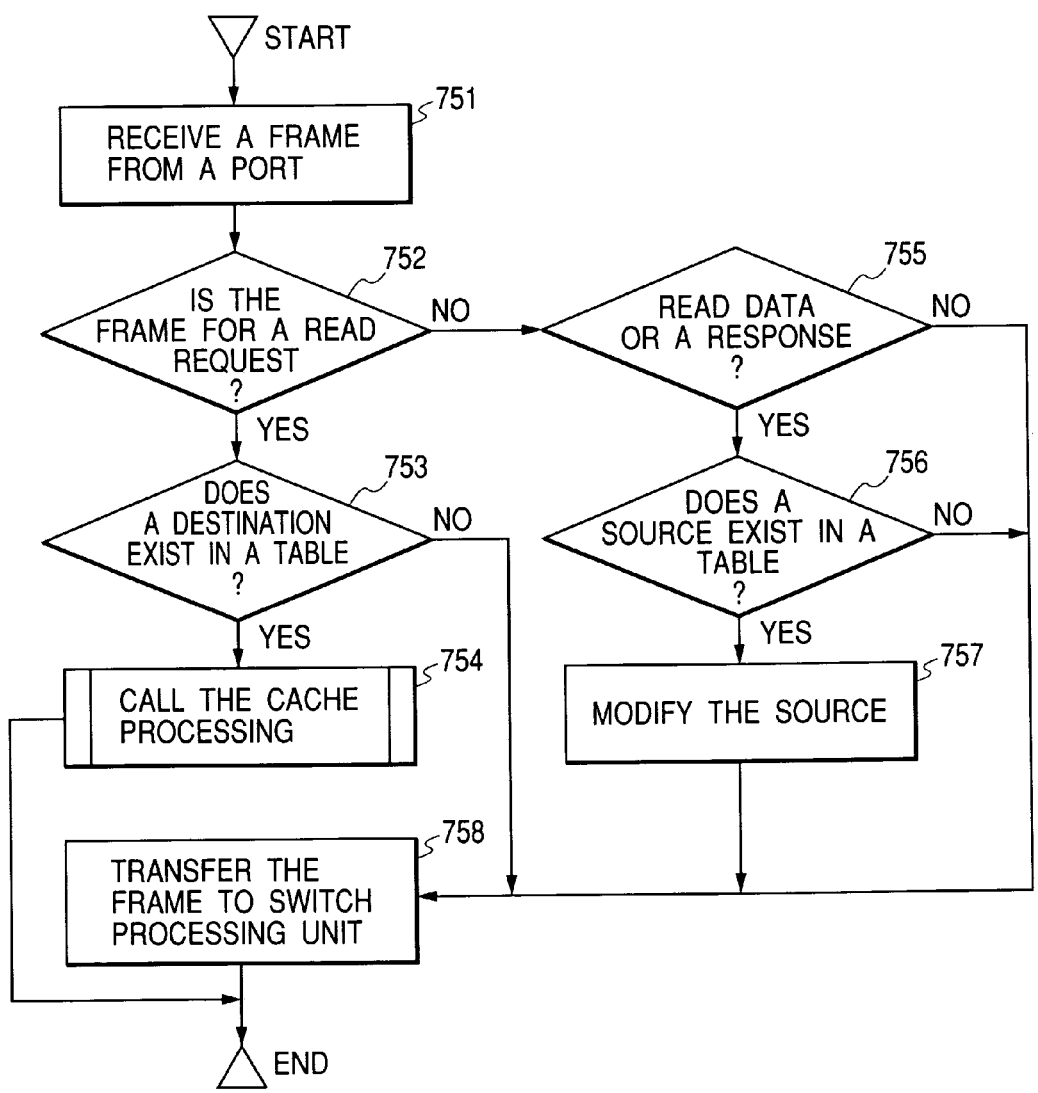
FIG. 18 is a flowchart illustrating address translation processing according to the sixth embodiment.

FIG. 18 is a flowchart illustrating a series of processing executed in the address translation unit 114 according to this embodiment. Incidentally, the series of processing is performed when the CPU 1141 executes the address translation program 726.

In the first place, the instant the port 111 receives a frame, the CPU 1141 starts execution of the address translation program 726 (step 751).

Next, the CPU 1141 judges whether or not the received frame is intended for a read request (step 752). If the received frame is intended for a read request, the CPU 1141 judges whether or not data requested by the read request is data stored in a LUN of the storage device 104 as a target to be copied (more specifically, original data). To be more specific, the CPU 1141 searches for the copy management entry 732 in which a destination SAN address, and a LUN, of the read request match values stored in the entries 733, 734 (step 753).

If the copy management entry 732 satisfying the condition is found in step 753, the CPU 1141 instructs the controller 112 to execute the cache processing program 727. At this time, the CPU 1141 transmits to the controller 112 the received frame, and information stored in the copy management entry 732 that has been selected in step 753 (step 754). The instant the processing of step 754 ends, the CPU 1141 ends the series of processing.

On the other hand, if it is judged that the frame received in step 752 is not intended for a read request, the CPU 1141 judges whether or not the frame is intended for read data or a response (step 755). If the frame is intended for read data or a response, the CPU 1141 judges whether or not the received frame is transmitted from the storage device 104 (in this case, 104*b*) that stores copy data. To be more specific, the CPU 1141 judges whether or not the copy management table 731 has the copy management entry 732 whose field 735 value stored in the field agrees with the frame source (step 756).

If the copy management entry 732 satisfying the condition exists in the copy management table 731 in step 756, the CPU 1141 uses the copy management entry 732, which has been found in step 756, to change a source of the frame to an original SAN address stored in the entry 733 (step 757).

If a destination of the frame as the read request does not exist in the copy management table 731 in step 753, if it is judged in step 755 that the frame is neither read data nor a response, or if a source of the frame does not exist in the copy management table 731 in step 756, the CPU 1141 transmits the frame completing the processing to the switch processing unit 115 before ending the series of processing (step 758).

Figure 19:
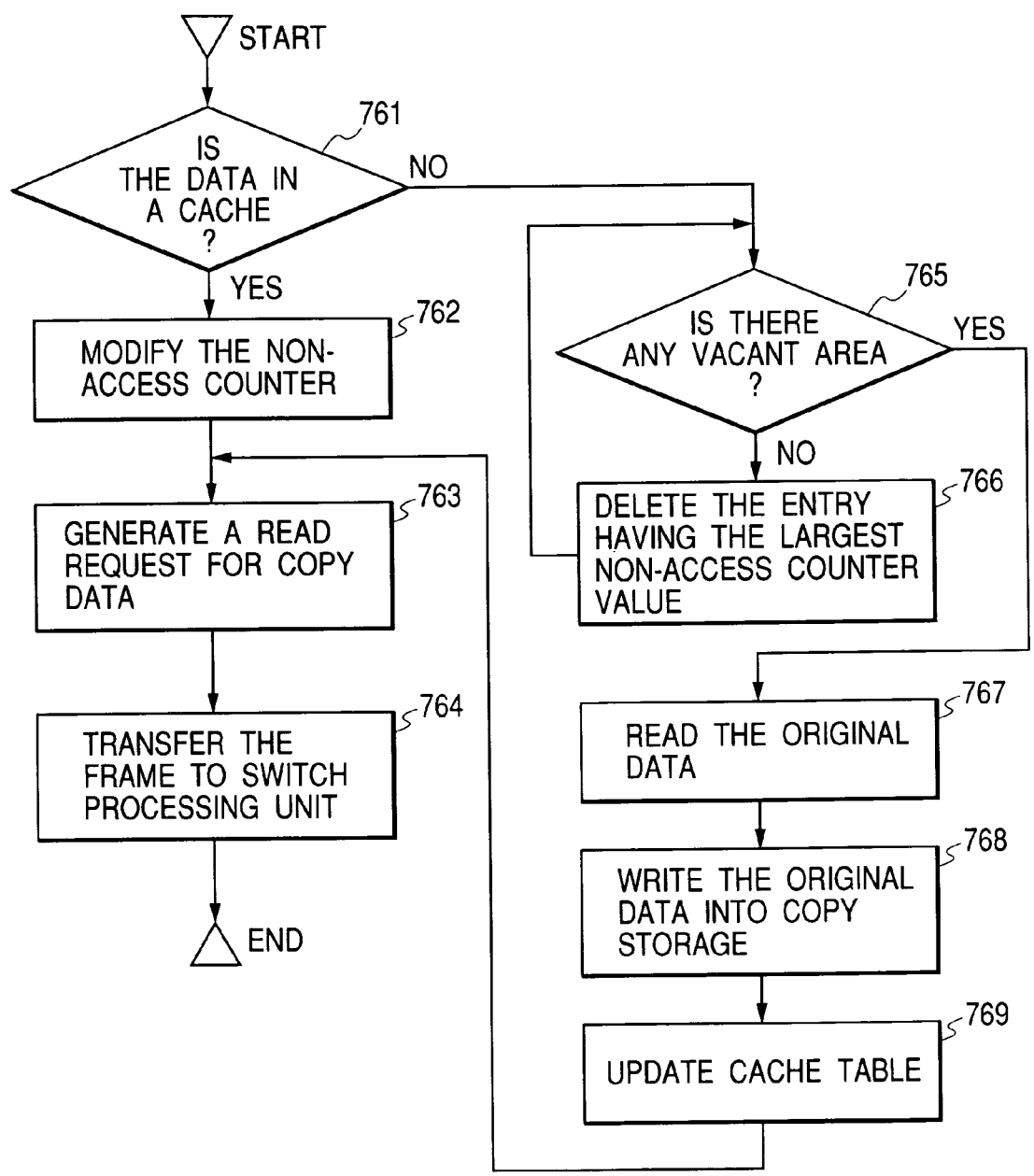
FIG. 19 is a flowchart illustrating cache processing according to the sixth embodiment.

FIG. 19 is a diagram illustrating a series of processing executed by the controller 112 according to an instruction from the address translation unit 114 in step 754. The series of processing proceeds when the controller 112 executes the cache processing program 727.

Upon receipt of instruction from the address translation unit 114, the controller 112 judges whether or not a storage area of the storage device 104a storing original data specified by a LBA, and a length, of the read request, which is contents of the frame received from the address translation unit 114, is stored in the storage device 104b in which copy data is stored. To be more specific, in the cache table 741 specified by a value stored in the entry 737 of the copy management entry 732, which has been transmitted from the address translation unit 114, the CPU 1121 judges whether or not an area specified by a LBA, and a length, of the read request is included in an area specified by the entries 743, 745, and at the same time judges whether or not the cache entry 742 whose validity flag is 1 exists (step 761).

If the cache entry 742 satisfying the condition of step 761 exists, the CPU 1121 updates a non-access counter 746 of a valid cache entry 742 included in the cache table 741 used in step 761. More specifically, the CPU 1121 sets a value of the entry 746 in the cache entry 742 satisfying the condition of step 761 at 0, and then increments by one a value stored in the entry 746 in each of all other valid cache entries 742 (step 762).

After that, the CPU 1121 generates a read request for copy data. To be more specific, the CPU 1121 changes values stored in the entries 735, 736 of the copy management entry 732, transmitted from the address translation unit 114, to a destination SAN address and a LUN respectively. Moreover, the CPU 1121 uses information stored in the cache entry 742 found in step 761 to change the LBA to a value determined by (a LBA specified by the read request+ a value stored in the entry 744− a value store in the entry 743), and also to change the length to a value stored in the entry 745 (step 763). The CPU 1121 then transmits the processed frame to the switch processing unit 115 (step 764).

On the other hand, if the cache entry 742 satisfying the condition of step 761 does not exists, the CPU 1121 judges whether or not a vacant area enough to store data having a length specified by the read request exists in a storage area of the storage device 104b for storing copy data specified by the copy management entry 732. Further, the CPU 1121 judges whether or not the cache table 741 includes the cache entry 742 that is not used. More specifically, by use of information about all valid cache entries 742 of the cache table 741, the CPU 1121 checks storage areas currently used in the storage device 104b, and thereby finds out from the storage device 104b a free storage area having a length greater than or equal to the length value included in the read request (step 765).

If a storage area which is not registered in any valid cache entry 742 and has a length greater than or equal to the length value included in the read request is not found in the storage device 104b, or if the cache entry 742 cannot be updated because all cache entries 742 are valid, the CPU 1121 deletes or invalidates one of the valid cache entries 742 in the cache table 741 to extend a free storage area.

To be more specific, the CPU 1121 finds the cache entry 742, the entry 746 of which has the largest value among those stored in the entries 746 of the valid cache entries 742, and then sets the value of the entry 747 of the found cache entry 742 at 0 (step 766). After that, the CPU 1121 repeats the processing of step 765.

If a storage area which is not registered in any valid cache entry 742 and has a length greater than or equal to the length value included in the read request is found in the storage device 104b, and the number of invalid cache entries 742 found is one or more, the CPU 1121 updates the found cache entry 742, and then stores the association of original data specified by the read request with the found storage area of the storage device 104b. Accordingly, first of all, the original data is copied. To begin with, if an appropriate storage area is found and at least one invalid cache entries 742 is found, then the CPU 1121 reads out original data, which is specified by the read request, from the storage device 104a that holds the original data. More specifically, the CPU 1121 creates a read request for the original data, in which a source is a SAN address of the controller 112, and then transmits the read request to the switch processing unit 115. Subsequently, the CPU 1121 stores in the memory 1122 the read data that has been transmitted from the storage device holding the original data (step 767).

After that, the CPU 1121 transmits the original data stored in the memory 1122 to the storage area of the storage device 104b which has been found in step 765 (step 768). The CPU 1121 then updates the cache table 741. To be more specific, as for the invalid cache entry 742 found in step 765, the CPU 1121 stores in the entry 744 a copy LBA corresponding to the storage area that stores data transmitted from the memory 1122, and also stores in the respective entries 743, 745 an original LBA and an original length corresponding to the storage area of the original data. Additionally, the CPU 1121 sets a value of the entry 746 in the cache entry 742 at 0, and sets a value of the entry 747 at 1 (step 769). After that, the CPU 1121 executes processing of step 763 and beyond.

A series of operation according to this embodiment will be summarized as below.

To begin with, the user or administrator of the system uses the management terminal 106 connected to the copy management switch 703 to make settings in the copy management table 731 so that the original data stored in a storage area specified by a LUN in the storage device 104a is copied to a storage area specified by a LUN in the storage device 104b. At this point of time, data is in a state of not yet having been copied to the storage device 104b. In other words, although the copy management entry 732 of the copy management table 731 exists, all the cache entries 742 of the cache table 741 corresponding to the cache index 737 of the copy management entry 732 are invalid, which represents an initial state.

If the host 105 issues a read request for the original data held in the storage device 104a in the initial state, a frame containing the read request arrives at the copy management switch 703.

On detecting the receipt of the frame, the address translation unit 114 starts the address translation program 726. Here, the address translation unit 114 judges that the read request is a request for the original data, and therefore instructs the controller 112 to execute the cache processing program 727.

The instructed controller 112 then searches for the cache entry 742 corresponding to the data specified by the read request. At this point of time, because the data is not yet be transmitted to the storage device 104b, the corresponding cache entry 742 is not found. For this reason, the controller 112 issues a read request to the storage device 104a, and then transfers its read data to the storage device 104b. In addition, the controller 112 stores in the cache table 741 the cache entry 742 corresponding to the data transferred to the storage device 104b.

Moreover, the controller 112 generates, from the received frame containing the read request, a frame containing a read request for the copy data whose source is the host 105. Then, the controller 112 transmits the generated frame to the switch processing unit 115.

The switch processing unit 115 transmits the frame to the storage device 104b. The storage device 104b, which has received the frame, then transmits a frame of read data whose destination is the host 105 to the host 105 via the copy management switch 703.

In this case, the address translation unit 114, which has received the frame of read data, judges the read data of the received frame to be copy data. The address translation unit 114 changes a source of the read data to the storage device 104a, and then transfers the read data to the switch processing unit 115.

The switch processing unit 115 transfers the read data to the host 105. The read data arrives at the host 105 as data transmitted from the storage device 104a.

As a result of the flow of the processing described above, a copy is created in the storage device 104b according to the read request from the host 105, and consequently the cache entry 742 is created in the cache table 741.

After that, if the host 105 issues a read request for the same original data again, the controller 112 receives a frame containing the read request, and thereby can find a cache entry 742 corresponding to the original data. In this case, the controller 112 generates a read request for copy data whose source is the host 105 according to the frame of the read request, and then transmits the frame to the switch processing unit 115.

In this manner, the second read request is handled by use of only the copy data stored in the storage device 104b. This speeds up the processing of the read request. Additionally, in this embodiment, only the original data that is actually accessed by the host is copied. Moreover, the non-access counter 746 is used to delete, from the cache entry 742, copy data that has not been accessed for the longest time. In other words, only data whose frequency of accesses from the host is high is held in the storage device 104b. Thus, this embodiment enables efficient use of the storage capacity of the storage device 104b.

The method used to delete the cache entry 742, described in this embodiment, is a method that is in general called LRU (Least Recently Used). However, another method may also be used.

Moreover, in this embodiment, the copy management device reads out from the storage device 104a original data specified by a read request issued from the host 105, and then stores the read data in the memory 1122 before transferring the read data to the storage device 104b for storing copy data. However, not only the original data specified by the read request issued from the host 105 but also data before and behind the original data may also be read out from the storage device 104a.

With respect to the storage area specified by a read request issued from the host 105, data may be read out from a storage area that starts from the same starting location as that of the specified storage area and is longer than the specified length. Reading out data in this manner increases a possibility that if the host 105 issues read requests for consecutive areas, data requested by the next read request will be found in the storage device 104b. Further, the whole storage area specified by a SAN address and a LUN may also be read.

In addition, if the storage device 104a can handle the EXTENDED COPY command of SCSI, a data read request for the storage device 104a may also be replaced with a data copy request for the storage device 104a to the storage device 104b. Moreover, the controller 112 may also be provided with a dedicated buffer memory used to transfer original data to the storage device 104b for storing copy data. Furthermore, read data may also be transmitted to the host 105 concurrently with transferring the read data to the storage device 104b that holds copy.

According to the present invention, it is possible to speed up an access to data held in a storage device connected to a SAN.

Further, according to the present invention, since the amount of data flowing through a SAN can be reduced, a load on the SAN can be reduced.

What is claimed is:

1. A network system comprising:
   a computer;
   a switch that is coupled to said computer via a network;
   a first storage device that is coupled to said switch via the network, said first storage device storing first data; and
   a second storage device that is coupled to said switch via the network;
   wherein said computer issues a first read request for the data stored in said first storage device;
   wherein when said switch receives said first read request, if said second storage device has second data that is copy data of said first data, said switch converts said first read request into a second read request for said second data, and transmits said second read request to said second storage device via the network, wherein if said second storage device does not have said second data, said switch transmits said first read request to said first storage device via the network;
   wherein when receiving the data, said switch transfers the received data to said computer as said first data from said first storage devices;
   wherein said first storage device includes a plurality of addressable storage areas for storing said first data, while said second storage device includes a plurality of addressable storage areas for storing said second data;
   wherein said first read request includes a first destination address where said first data resides;
   wherein said switch has information of whether or not said second storage device has said second data; and
   wherein if said second storage device has said second data, said switch changes said first destination address to a second destination address, where said second data resides, to be incorporated into said second read request.

2. A network system according to claim 1,
   wherein said switch has information of whether or not said second storage device has said second data, and said switch determines a destination of the read request in accordance with said information.

3. A network system according to claim 1,
   wherein said switch transmits the read request to either said first storage device or said second storage device via the network in accordance with information related to presence of said second data.

4. A network system according to claim 1,
   wherein said first storage device comprises a network interface coupled to said network and a processor coupled to said network interface, said processor reading said first data in accordance with said first read request and transmitting said first data back to said switch through said network interface and said network.

5. A network system according to claim 1, wherein:
said second storage device further includes third data that is not copy data of said first data; and
when said computer issues a third read request for said third data via the network, said switch receives said third read request and transmits said third read request to said second storage device via the network.

6. A network system according to claim 1,
wherein if said second storage device does not have said second data, said switch transfers said first data received from said first storage device to said second storage device in response to said first read request, and said switch updates said information to indicate that said second storage device has as said second data the copy data of said first data currently requested by said computer.

7. A network system according to claim 6,
wherein when said switch has found that an amount of free storage capacity in said second storage device is not enough to store said first data to be transferred, said switch obtains an amount of storage area in said second storage device sufficient for storing said first data to be transferred in such a manner that said switch chooses a storage area occupied by data with the least frequency of use by said computer from among all of said second data in said second storage device.

8. A switch to be coupled to a computer a first storage device and a second storage device via a network, said first storage device storing first data, said switch comprising:
a port unit to be coupled to said network;
a converter for converting commands and data received by said port unit; and
a switch unit for relaying said command and said data toward a destination of said data in accordance with address information thereof;
wherein when said port unit receives a first read request for said first data from said computer via the network, if said second storage device has second data that is copy data of said first data, said converter converts said first read request into a second read request for said second data, and said switch unit transmits said read request to said second storage device through said port unit, wherein if said second storage device does not have said second data, said switch unit transmits said first read request to said first storage device through said port unit without being converted by said converter;
wherein said switch has information of whether or not said second storage device has said second data;
wherein when receiving the data, said switch unit transfers the received data to said computer as said first data from said first storage device;
said first storage device includes a plurality of first storage areas where said first data resides, and a first controller to read said first data from said first storage area and to send a first response which includes said first data and a first initiator identifier for identifying said first storage device, back to said switch through said network;
said second storage device includes a plurality of second storage areas where said second data resides, and a second controller to read said second data from said second storage area and to send a second response which includes said second data and a second initiator identifier for identifying said second storage device, back to said switch through said network;
wherein when said switch receives said first response through said port unit, said switch unit transmits said first response as a reply to said first read request, through said port unit and said network;
wherein when said switch receives said second response through said port, said converter converts said second response into a third response which includes said second data and said first initiator identifier instead of said second initiator identifier; and
wherein said switch unit transmits said third response as a reply to said first read request, through said port unit and said network.

* * * * *